(12) United States Patent
Hehn

(10) Patent No.: US 8,136,886 B2
(45) Date of Patent: Mar. 20, 2012

(54) DISPLACEMENT ACTUATED SIDE DUMPING HAUL BODY

(75) Inventor: Ronald L. Hehn, Hawley, MN (US)

(73) Assignee: Black Swamp Industries, Inc., Hawley, MN (US)

( * ) Notice: Subject to any disclaimer, the term of this patent is extended or adjusted under 35 U.S.C. 154(b) by 0 days.

(21) Appl. No.: 12/756,556

(22) Filed: Apr. 8, 2010

(65) Prior Publication Data

US 2010/0194173 A1 Aug. 5, 2010

Related U.S. Application Data

(63) Continuation of application No. 11/419,687, filed on May 22, 2006, now Pat. No. 7,722,125.

(60) Provisional application No. 60/746,729, filed on May 8, 2006, provisional application No. 60/746,729, filed on May 26, 2005.

(51) Int. Cl.
*B60P 1/04* (2006.01)
*B60P 1/30* (2006.01)

(52) U.S. Cl. ........................................................ 298/18

(58) Field of Classification Search .............. 298/17 R, 298/17.5, 17.6, 17.7, 18, 19 R, 22 R, 23 R; 414/470

See application file for complete search history.

(56) References Cited

U.S. PATENT DOCUMENTS

| | | | |
|---|---|---|---|
| 651,428 A | 6/1900 | Sinclair | |
| 711,420 A | 10/1902 | Farlow et al. | |
| 730,607 A | 6/1903 | Brown | |
| 1,812,915 A | 7/1931 | Wright | |
| 1,965,476 A | 7/1934 | Smith | |
| 2,953,408 A | 9/1960 | Koenig | |
| 3,730,591 A | 5/1973 | Griffis | |
| 3,964,791 A | 6/1976 | Griffis | |
| 4,076,310 A | 2/1978 | Schwalm | |
| 4,323,279 A | 4/1982 | Domes et al. | |
| 4,494,798 A | 1/1985 | Bailey | |
| 4,621,858 A | 11/1986 | Hagenbuch | |
| 4,773,598 A | 9/1988 | Jones | |
| 5,431,481 A | 7/1995 | Boyer | |
| 5,480,214 A | 1/1996 | Rogers | |
| 5,967,615 A | 10/1999 | Rogers | |
| 6,015,191 A | 1/2000 | Bontrager | |
| 6,056,368 A | 5/2000 | Rogers | |
| 6,089,670 A | 7/2000 | Rogers | |
| 6,106,072 A | 8/2000 | Lutter, Jr. | |
| 6,179,385 B1 | 1/2001 | Rogers | |
| 6,199,955 B1 | 3/2001 | Rogers | |
| 6,206,477 B1 | 3/2001 | Rexus et al. | |
| 6,257,670 B1 | 7/2001 | Rogers | |
| 6,382,731 B1 | 5/2002 | Slutz et al. | |
| 6,402,453 B1 | 6/2002 | Jensen et al. | |
| 6,425,726 B1 | 7/2002 | Jensen et al. | |
| 6,428,264 B1 | 8/2002 | Jensen et al. | |
| 6,488,340 B2 | 12/2002 | Jensen | |

(Continued)

*Primary Examiner* — H Gutman
(74) *Attorney, Agent, or Firm* — Marsh Fischmann & Breyfogle LLP

(57) ABSTRACT

A displacement actuated side dumping haul body and related methods are disclosed. The side dumping haul body may, for example, be mounted to a trailer or truck frame. The side dumping haul body includes a floor with fore and aft end walls rigidly attached to the floor, at least one actuator and first and second sidewalls. When the at least one actuator is employed to pivot the floor to dump material from the haul body, the corresponding sidewall pivots at least generally away from the floor to create a side discharge opening. Various opening parameters and dumping characteristics can be achieved by varying locations of pivot and linkage points.

22 Claims, 15 Drawing Sheets

U.S. PATENT DOCUMENTS

| | | |
|---|---|---|
| 6,520,589 B2 | 2/2003 | Jensen et al. |
| 6,554,367 B2 | 4/2003 | Jensen |
| 6,601,924 B1 | 8/2003 | Hicks |
| 6,626,498 B1 | 9/2003 | Ostermeyer |
| 6,669,304 B2 | 12/2003 | Binning |
| 6,905,175 B1 | 6/2005 | Verros |
| 7,111,907 B2 | 9/2006 | Boon |
| 2009/0195050 A1* | 8/2009 | Rogers et al. .......... 298/18 |
| 2009/0195051 A1* | 8/2009 | Rogers et al. .......... 298/18 |
| 2009/0195052 A1* | 8/2009 | Rogers et al. .......... 298/18 |

* cited by examiner

DISPLACEMENT ACTUATED SIDE DUMPING HAUL BODY

RELATED APPLICATIONS

This application is a continuation application of U.S. patent application Ser. No. 11/419,687, filed May 22, 2006, now U.S. Pat. No. 7,722,125, and entitled "Displacement Actuated Side Dumping Haul Body." This application also claims priority from U.S. Provisional Patent Application Ser. No. 60/684,867, filed May 26, 2005, entitled "Displacement Actuated Side Dumping Haul Body," and further claims priority from U.S. Provisional Patent Application Ser. No. 60/746,729, filed May 8, 2006, and entitled "Displacement Actuated Side Dumping Haul Body." The entire disclosure of each of the above-noted patent applications is incorporated by reference in their entirety herein.

FIELD OF THE INVENTION

The present invention generally relates to side dumping bodies, and more particularly, to towed or truck mounted side dumping haul bodies. Further, this invention relates to side displacement actuated dumping haul bodies with movable sidewalls.

BACKGROUND OF THE INVENTION

Haul bodies have long been used to haul various bulk materials over relatively significant distances. Typical bulk materials include rock, sand, gravel, dirt, agricultural products, etc. Many haul bodies are capable of dumping bulk materials by elevating or pivoting at least a portion of the haul body. Common examples are rear dumping dump trucks and side dumping haul bodies mounted on trailers. One typical rear dumping dump truck has an aft-located end wall or tailgate that swings open as the body is elevated. A typical side dumping haul body is tilted in its entirety and in a lateral direction to a degree at which the payload spills over a sidewall and is expelled to the side of the haul body. Also typically, the payload may be selectively dumped to either the left or to the right of the side dumping haul body. Depending on conditions where the payload is to be dumped, either a side dumping haul body or a rear dumping haul body may be preferred. Where a side dumping haul body configuration is preferred, the haul body will typically include a partially enclosed structure consisting of a floor structure, two laterally opposed side panels and fore and aft located end walls. Such a haul body will typically have an open top. Although in many circumstances existing side dumping haul bodies have significant advantages over rear dumping haul bodies, existing side dumping haul bodies do have some disadvantages.

Side dumping bodies come in many shapes and sizes and generally are sized based upon payload density to provide desired axle loading. Typically, existing side dumping haul bodies are configured like an elongated tub where the sidewalls and floor are a single element. Generally, the sidewalls are angled to aid in the dumping process. Fore and aft located end walls cap the tub structure and which has no moveable panels, as opposed to a tail gate common to a typical dump truck. Commonly, pivoting the entire tub structure about a longitudinal axis dumps the load. Hydraulic cylinders typically provide the force necessary to pivot the tub structure. By selectively pinning the tub structure to a left or right axis, the tub structure can be pivoted about the pinned axis. The material in the tub structure is eventually dumped over a sidewall of the tub structure.

There are several disadvantages to a side dumping haul body with a rigid tub structure. The tub structure must often be pivoted to extreme angles to achieve a final angle large enough to allow the payload to overcome friction and slide from the haul body. However, pivoting the haul body to extreme angles may result in instability and the rolling of the entire side dumping haul body onto its side. This may happen when, for example, the center of gravity of a side dumping haul body and retained material shifts beyond the point of the outer tire of the transport vehicle, causing a roll moment which may lead to a rollover. Oftentimes, the maximum dump angle achievable by current tub type side dumping haul body designs is about 45°. Under certain conditions, this may be inadequate for full shedding of the payload.

To enhance the dumping of material out of the haul body, known tub type side dumping haul bodies generally have relatively shallow sidewalls. However, this leads to a length-to-capacity ratio that is large when compared to other types of dumping haul bodies. The extended length necessary to achieve particular hauling capacities also increases bending moments on the body while dumping.

Side dumping haul bodies with hinged movable sidewalls are also known. By incorporating hinged movable sidewalls, as opposed to the fixed tub design as described above, a side dumping haul body may have vertically disposed sidewalls, decreasing the length-to-capacity ratio. However, these hinges are typically along the upper or lower edges of the sidewalls. There are several disadvantages to such hinged sidewalls. For example, hinged, movable sidewalls may become damaged during loading or unloading. Sidewalls that are only hinged may move uncontrollably due to the force of the payload when the mechanism used to position the sidewall in the closed position is released. Bottom hinged sidewalls may interfere with the position of materials that have been dumped. This type of sidewall may also be difficult to raise back into the closed position. Top hinged sidewalls may swing uncontrollably when the dumping process is started, leading to reduced control of the dumping process. Top hinged sidewalls also may be difficult to return to the closed position, particularly if the haul body is not on level ground or material within the haul body is interfering with full closure.

Some known side dumping haul bodies use hydraulics to move sidewalls during the dumping process. However these systems also utilize hinges along the top or bottom edge of the sidewalls, and therefore share many of the shortcomings discussed above. Also known moving sidewalls systems require additional actuators and latches.

Accordingly, it would be desirable to provide a side dumping haul body where steep floor dumping angles can be achieved without a significant loss in stability. Similarly, it would be desirable to provide a side dumping haul body with movable sidewalls that are not hinged along the top or bottom edges of the sidewalls. It would also be desirable to provide a side dumping haul body with movable sidewalls, where separate latching operations would not be required to secure the sidewalls in the lowered or neutral position.

SUMMARY OF THE INVENTION

Accordingly, the present invention is generally embodied by a displacement actuated side dumping haul body that may be designed to hold materials within the side dumping haul body during transport and selectively dump materials from the side dumping haul body. The side dumping haul body may be mounted to a trailer which may then be hauled by a tractor or any other appropriate "vehicle" from loading sites to dumping sites. Additionally, the side dumping haul body may be mounted to a variety of structures where it is desirable that materials be intermittently confined and dumped from the haul body. Such structures may include trailers, trucks, rail cars and industrial bins. In the case of a truck mounted side dumping haul body, the haul body may be mounted to the frame of the truck.

A first aspect of the present invention is embodied by a side dumping haul body that includes a tiltable floor and an actuator operable to lift a sidewall of the side dumping haul body at least generally away from the floor. The side dumping haul body may generally include the floor, fore and aft end walls longitudinally spaced apart from each other and two laterally opposed sidewalls. An actuator may be interconnected with a first sidewall, wherein activation of the actuator results in an entirety of the first sidewall generally lifting away from the floor. A discharge opening may then be created between the sidewall and the floor. The actuator may also be interconnected with the floor so that activation of the actuator also tilts the floor in a lateral direction while simultaneously lifting the entirety of the sidewall at least generally away from the floor, although such is not required by the broadest interpretation of the first aspect.

Various refinements exist of the features noted in relation to the subject first aspect of the present invention. Further features may also be incorporated in the subject first aspect of the present invention as well. These refinements and additional features may exist individually or in any combination. The actuator may be interconnected with the second sidewall, wherein activation of the actuator may selectably lift the entirety of the first sidewall or the second sidewall away from the floor while the floor is being tilted. Accordingly, the materials within the side dumping haul body may selectably be dumped from either the left or right side of the side dumping haul body. In one embodiment and as noted above, the force used to tilt the floor may also be used to move the first and/or second sidewall at least generally away from the floor to create a relevant discharge opening.

A tarp or other flexible covering may be interconnected to the top of the first sidewall and the top of the second sidewall. Since the discharge opening may be created between either a bottom edge of the first sidewall and the floor or between a bottom edge of the second sidewall and the floor, the tarp may remain interconnected while material is being dumped from the side dumping haul body. The tarp may be removable to facilitate the loading of materials into the side dumping haul body.

The side dumping haul body may be interconnected to a frame, wherein the frame may be, for example, a trailer frame, truck frame or rail car frame. The floor may be selectably fixed to the frame and tiltable about the frame along a first side dump axis. The fore and aft end walls of the side dumping haul body may be permanently and rigidly affixed to the floor. Furthermore, the first sidewall may be pivotally attached to the fore end wall and the aft end wall along a first sidewall pivot axis. The actuator in this arrangement may be interconnected to the frame and the aft end wall. A second actuator may be interconnected to the frame and the fore end wall. The second actuator may assist the first actuator. Alternatively, one or more actuators may be placed in other locations where activation of the actuator would result in the floor tilting relative to the frame.

A first link may be interconnected to the frame and the first sidewall. In such a configuration, when the floor is pivotally interconnected to the frame along the first side dump axis, activation of the actuator would result in the floor tilting about the first side dump axis and the first sidewall pivoting relative to the floor due to the interconnection between the first sidewall and the first link. The side dumping haul body may also include a second sidewall movable relative to the floor and connected to a second link, wherein the second link also may be interconnected to the frame and the second sidewall. In such a configuration, when the floor is tiltably interconnected to the frame along the second side dump axis, activation of the actuator would result in the floor tilting about the second side dump axis and the second sidewall pivoting relative to the floor due to the interconnection between the second sidewall and the second link.

By varying the points at which the first link and the second link interconnect with the frame and the locations of the first and second sidewall pivot axes, various dumping characteristics can be achieved. These characteristics may include the overall speed at which a load is dumped, the rate at which the material exits the side dumping haul body, and/or the ability of materials to be wind rowed in a controlled manner. The first link to frame interconnection and the second link to frame interconnection may be coaxial. Alternatively, the first link to frame interconnection may be coaxial with the first side dump axis and the second link to frame interconnection may be coaxial with the second side dump axis.

Alternatively, the first link to frame interconnection and the second link to frame interconnection may be placed in other positions to achieve other desired sidewall motion profiles. The first link to frame interconnection, the second link to frame interconnection, a first link to first sidewall interconnection, and a second link to second sidewall interconnection may all be disposed at common elevation. Alternatively, the first link to frame interconnection and the second link to frame interconnection may be disposed a first elevation and the first link to first sidewall interconnection and the second link to second sidewall interconnection may be disposed at a different, second elevation. The elevations may be varied to achieve various dumping characteristics. The first and second elevations may each be closer to a lower extreme of the side dumping haul body than to an upper extreme of the side dumping haul body. Alternatively, the first elevation may be closer to the lower extreme of the side dumping haul body than the upper extreme of the side dumping haul body and the second elevation may be closer to the upper extreme of the side dumping haul body than the lower extreme of the side dumping haul body. The links may be rigid members or variable length members such as extendable cylinders, powered hydraulic cylinders, chains, cables, or any other type of link known to those skilled in the art.

The floor may be selectably pinned to the frame along the first side dump axis and the second side dump axis. By pinning the floor to the frame simultaneously along the first side dump axis and the second side dump axis, motion of the floor relative to the frame would be prohibited. By pinning the floor to the frame along the first side dump axis and unpinning the floor from the frame along the second side dump axis, the floor would be permitted to tilt relative to the frame about the first side dump axis, enabling the side dumping haul body to dump material to the first side of the side dumping haul body. Accordingly, by pinning the floor to the frame along the second side dump axis and unpinning the floor from the frame along the first side dump axis, the floor would be permitted to tilt relative to the frame about the second side dump axis enabling the side dumping haul body to dump material to the second side of the side dumping haul body.

The first sidewall may be curved in a constant radius about the first sidewall pivot axis. The second sidewall may be curved in a constant radius about the second sidewall pivot axis. The outer edges of the fore and aft end walls may be curved in a constant radius to match the constant radius of the first and second sidewalls. In this manner, for at least a portion of the motion of the sidewalls relative to the floor, the sidewalls may remain in contact with or ride on the outside edges of the fore and aft end walls.

In instances where the side dumping haul body is mounted to a transportable frame such as, for example, where the side dumping haul body is mounted to a trailer, truck frame, or rail car frame, the transportable frame will be interconnected to at least one axle oriented in a lateral direction. In such a configuration, the sidewalls and floors may be configured so that the center of gravity of the side dumping haul body does not shift by more than one quarter of the length of the axle when materials are being dumped from the side dumping haul body. This would keep the probability of the side dumping haul body capsizing during the dumping of materials to a relative minimum. It is a further benefit of the design that the load should be able to be dumped during motion of the transport vehicle with no significant stability or associated safety concerns.

The first sidewall may be configured with a channel in proximity to the lower edge of the first sidewall wherein, when in a lowered or neutral position, an outside edge of the floor fits into the channel. Such a positive engagement may help to reduce spillage of the material within the side dumping haul body during transportation and generally enhance the rigidity of the side dumping haul body in a lowered or neutral position. The channel may also provide support for the floor when the floor is loaded with materials.

The floor may be flat or V-shaped. A flat floor may maximize the volumetric efficiency of the side dumping haul body. This results in a side dumping haul body that is shorter in overall length than a side dumping haul body of equal load carrying ability but poorer volumetric efficiency. A V-shaped the floor may enhance the dumping characteristics of the side dumping haul body. When dumping material out of a side dumping haul body with a V-shaped floor, material may more readily slide from the haul body due to the increased angle of the floor section opposite from the dump axis, thereby improving disassociation of the hauled material from the floor and end walls during the dumping operation.

A second aspect of the present invention is embodied by a side dumping haul body that includes a frame, a tiltable floor having rigidly attached fore and aft end walls spaced in a longitudinal dimension, a first sidewall pivotally attached to the floor, and an actuator, wherein activation of the actuator results in both the floor tilting and the first sidewall pivoting relative to the floor. A second sidewall may also be pivotally attached to the floor. The floor may be selectably attached to the frame such that the floor is selectably tiltable about a first side dump axis or a second side dump axis.

Various refinements exist of the features noted in relation to the subject second aspect of the present invention. Further features may also be incorporated in the subject second aspect of the present invention as well. These refinements and additional features may exist individually or in any combination. The various features discussed above in relation to the first aspect of the present invention may be utilized by the second aspect of the present invention as well. In addition, the various features discussed in relation to the second aspect may be utilized by the first aspect as well.

A third aspect of the present invention is embodied by a method of unloading material from a side dumping haul body. The side dumping haul body includes fore and aft end walls that are spaced in a longitudinal dimension rigidly attached to a floor and a first and second sidewall that are spaced in a lateral dimension. The method includes exerting an unloading force on the side dumping haul body where the unloading force has an upwardly directed component. The exertion of the unloading force results in the tilting of the floor in a lateral dimension and the moving of a first sidewall relative to the floor to create a first discharge opening between the bottom edge of the first sidewall and the floor, resulting in materials flowing out of the side dumping haul body.

A fourth aspect of the present invention is embodied by a method of unloading a side dumping haul body. The side dumping haul body includes fore and aft end walls that are spaced in a longitudinal dimension and rigidly attached to a floor and a first and second sidewall that are spaced in a lateral dimension. The method includes selecting a lateral direction in which the floor is to be tilted and the material is to be dumped. This method also includes disengaging the floor from a frame to allow the floor to tilt in the selected lateral direction. This method further includes exerting a force with an upwardly directed component on the side dumping haul body resulting in the tilting of the floor in the selected lateral direction. This method further includes the moving of the sidewall corresponding to the selected lateral direction wherein that sidewall moves to create a discharge opening between it and the floor as a result of the exerted force.

Various refinements exist of the features noted in relation to the subject third and fourth aspects of the present invention. Further features may also be incorporated in the subject third and fourth aspects of the present invention as well. These refinements and additional features may exist individually or in any combination. The various features discussed above in relation to the first, second, third and fourth aspects of the present invention may be utilized by any of the aspects of the present invention as well.

DETAILED DESCRIPTION

Figure 1:
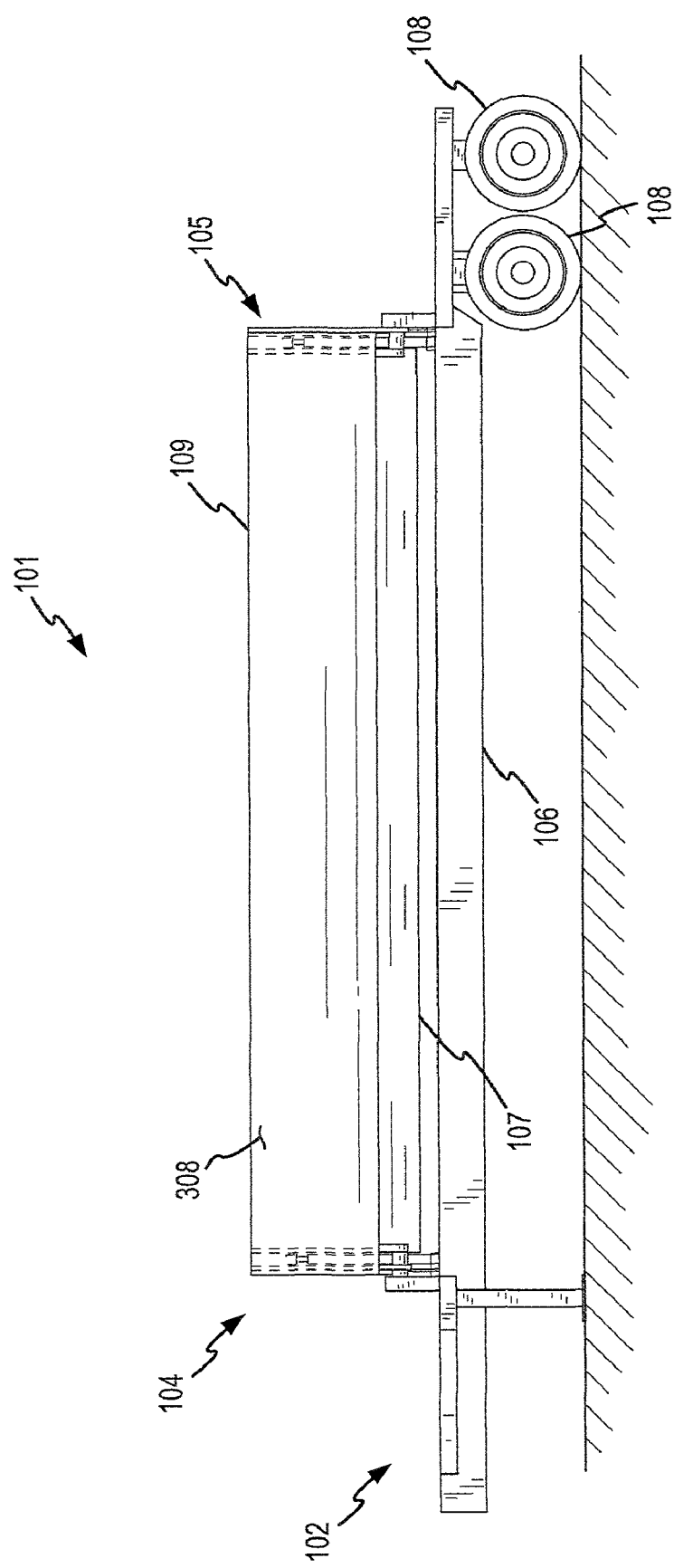
FIG. 1 is a side view of one embodiment of a displacement actuated side dumping haul body mounted on a trailer.

The apparatus disclosed and claimed herein can be made and executed without undue experimentation in light of the present disclosure. While the apparatus and methods of this invention have been described in terms of preferred embodiments, it will be apparent to those of skill in the art that variations may be applied to the apparatus and in the steps or in the sequence of steps of the methods described herein without departing from the concept, spirit and scope of the invention. More specifically, it will be apparent that certain dimensions of the various components making the invention may be varied to achieve the same or similar results. While configurations depicted in the drawings indicate particular component or feature locations, the skilled artisan will recognize that the manner of operation of the invention does not require these locations be precisely as shown. The manner of operation of the invention will not be significantly affected if these locations are not precisely observed and indeed, may be varied to obtain various motion profiles. Thus, all similar substitutes and modifications apparent to those skilled in the art are deemed to be within the spirit, scope and concept of the invention as defined by the appended claims.

Figure 2:
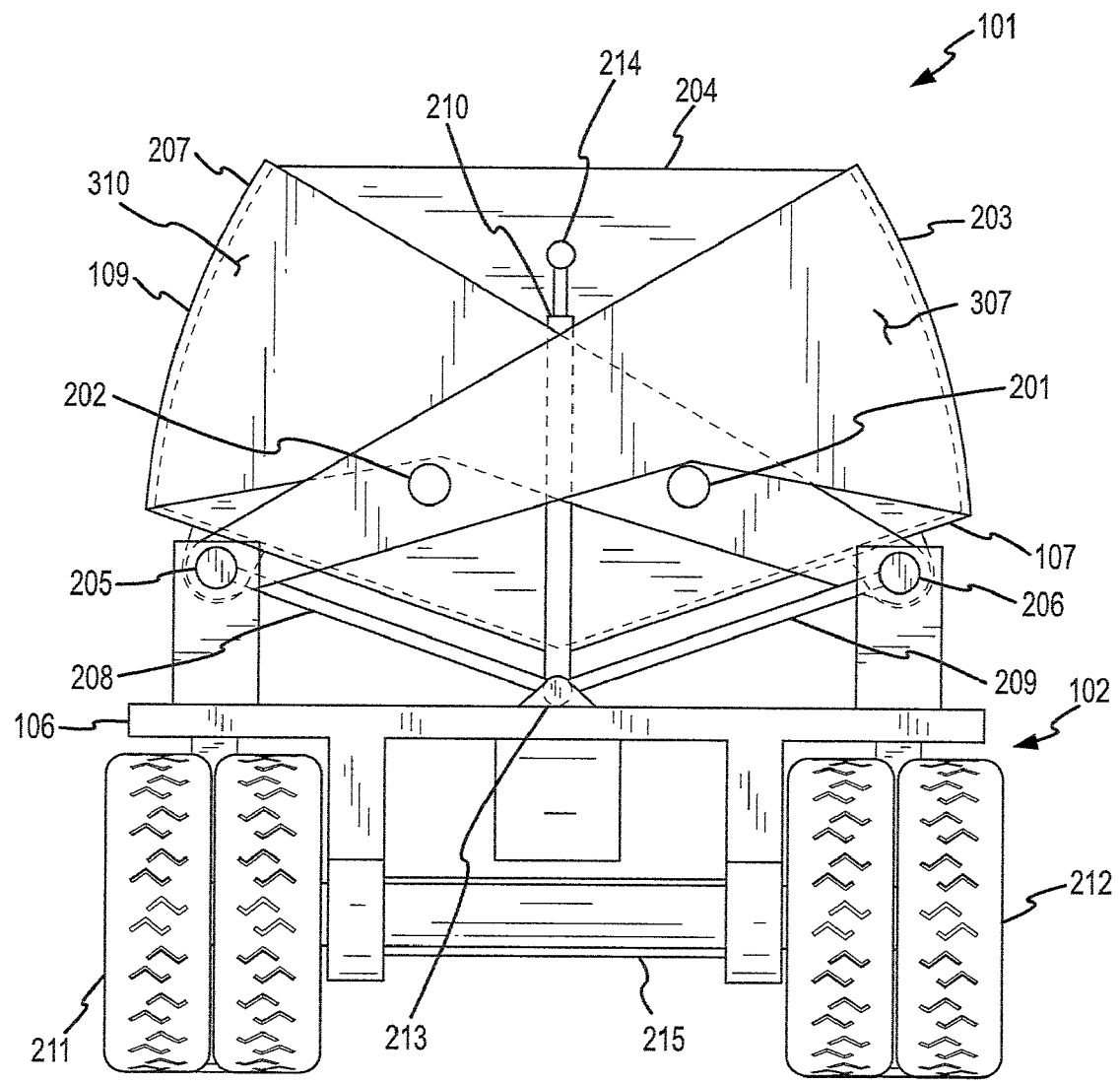
FIG. 2 is a rear end view of the side dumping haul body of FIG. 1.
Figure 3:
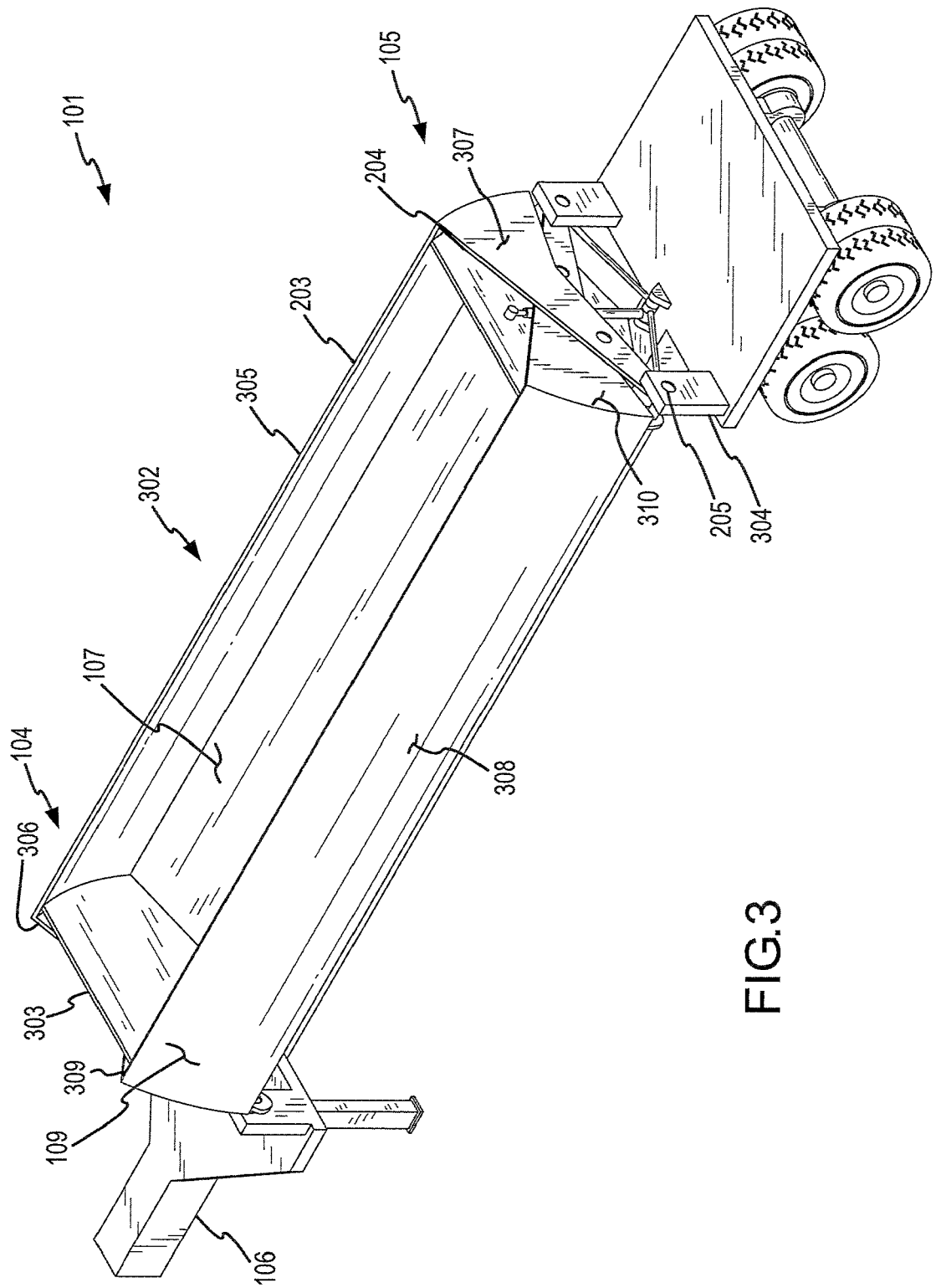
FIG. 3 is a perspective view of the side dumping haul body of FIG. 1.

FIGS. 1-3 generally illustrate a first embodiment of a displacement actuated side dumping haul body 101 mounted on a trailer 102. The trailer 102 may be transported from site to site by a tractor or any other appropriate "vehicle" (not shown). Although the illustrated trailer 102 is shown with eight wheels 108, the quantity and location of wheels 108 can be varied depending on factors such as desired handling characteristics and load carrying capability. Alternatively, the side dumping haul body 101 may be mounted to a truck chassis or the like (not shown). Other possible configurations include mounting the side dumping haul body 101 to railroad cars, movable industrial hoppers or any other application where hauled materials must be dumped from the hauling device. What is important in relation to the side dumping haul body 101 is the manner in which it is able to dump its load.

A longitudinal dimension of the side dumping haul body 101 may be characterized as being aligned with the direction of travel of the side dumping haul body 101 in FIG. 1. A lateral dimension may be characterized as being orthogonal to this longitudinal dimension. The trailer axles, on which are mounted the trailer wheels 108, thereby extend in the lateral dimension.

The side dumping haul body 101 may be movably (e.g., pivotally) mounted to or interconnected with a frame 106 of the trailer 102 in any appropriate manner. The side dumping haul body 101 includes a fore end wall 303 located at the fore end 104 of the side dumping haul body 101, an aft end wall 204 located at the aft end 105 of the side dumping haul body 101, a first sidewall structure 109, a second sidewall structure 203, and a floor 107 that collectively define a material holding area 302. The first sidewall structure 109 includes a first sidewall 308 that extends in the longitudinal dimension, as well as a pair of end sections 309, 310 that are spaced in the longitudinal dimension and that each extend in the lateral dimension. Similarly, the second sidewall structure 203 includes a second sidewall 305 that extends in the longitudinal dimension, as well as a pair of end sections 306, 307 that are spaced in the longitudinal dimension and that each extend in the lateral dimension. The fore end 104 and the aft end 105 of the side dumping haul body 101 are spaced in a longitudinal dimension. The fore end wall 303 and the aft end wall 204 are rigidly interconnected to the floor 107 or are otherwise maintained in a fixed position relative to the floor 107, while the first sidewall structure 109 and second sidewall structure 203 each may be selectively movable (e.g., pivotable) relative to the floor 107.

FIG. 2 illustrates an end view of the side dumping haul body 101 mounted on a trailer 102. The illustration depicts the side dumping haul body 101 in a lowered or neutral position. In such a lowered or neutral position, the side dumping haul body material holding area 302 may be formed by the floor 107, the first sidewall structure 109, the second sidewall structure 203, the aft end wall 204 and the fore end wall 303 (not visible in FIG. 2). FIG. 2, as with all figures depicting the aft end 105 of a side dumping haul body 101 contained herein, illustrates a configuration of components that may also be present at the fore end 104 of the side dumping haul body 101 as well.

Several mechanical features such as linkages, actuators and pivot points combine to control the motion and position of various components of the side dumping haul body 101. Although FIG. 2 illustrates one particular configuration, it should be appreciated that those skilled in the art may vary component dimensions and locations from those illustrated.

The side dumping haul body 101 of FIGS. 1-3 may be selectably moved or pivoted at least generally about either a first side dump axis 205 or a second side dump axis 206. Both the first side dump axis 205 and the second side dump axis 206 extend in the longitudinal dimension of the side dumping haul body 101. Several features located along the first side dump axis 205 and the second side dump axis 206 will now be described.

A portion of the frame 106 of the trailer 102 may be aligned with the first side dump axis 205. When in the lowered or neutral position, a portion of the floor 107 may also be aligned with the first side dump axis 205. Also, in the illustrated embodiment, a portion of the second sidewall structure 203 may be aligned with the first side dump axis 205. In this regard and as noted above, the second sidewall structure 203 includes a second sidewall 305 that extends in the longitudinal dimension, as well as a pair of end sections 306, 307 that are spaced in the longitudinal dimension and that each extend in the lateral dimension. The end sections 306, 307 are each aligned with the first side dump axis 205. Therefore and as shown in FIG. 2, the frame 106, the floor 107, and the end sections 306, 307 of the second sidewall structure 203 may all have portions aligned along the first side dump axis 205. A mechanical device, such as a pin inserted into holes in the frame 106, the floor 107, and the end sections 306, 307 of the second sidewall structure 203, may link the floor 107 and the second sidewall structure 203 together so that the only substantial relative motion between the frame 106 and the floor 107/second sidewall structure 203 would be a collective pivoting motion or the like of the floor 106/second sidewall structure 203 at least generally about the first side dump axis 205. Any other suitable way of selectively restricting motion of individual components relative to each other to allow for a collective pivoting motion or the like of the floor 107 and the second sidewall structure 203 at least generally about an axis known to those skilled in the art may be used. The pin or other locking device may be selectably engageable. The portion 304 of the frame 106 to which the second sidewall structure 203 and floor 107 may be selectably pinned is shown in FIG. 3 along the first side dump axis 205. However, any manner of fixing one or more of the floor 107 and the second sidewall structure 203 relative to each other, such that they may collectively move at least generally about the first side dump axis 205, may be utilized.

In a similar fashion, the frame 106, the floor 107, and the end sections 309, 310 of the first sidewall structure 109 may all have portions aligned along the second side dump axis 206. A similar mechanical device to that discussed above may be used to link these components with respect to each other so that the only substantial relative motion between the frame 106 and the floor 107/first sidewall structure 109 would be a collective pivoting motion or the like of the floor 107/first sidewall structure 109 at least generally about the second side dump axis 206. Any other suitable way of selectively restricting motion or the like of individual components relative to each other to allow for a collective pivoting motion or the like of the floor 107 and the first sidewall structure 109 at least generally about an axis known to those skilled in the art may be used. As along the first side dump axis 205, the pin or other locking device along the second side dump axis 206 may be selectably engageable. Moreover, any manner of fixing one or more of the floor 107 and the first sidewall structure 109 relative to each other such that may collectively move at least generally about the second side dump axis 206 may be utilized It should be appreciated that if the floor 107 is pinned or locked to the frame 106 along the first side dump axis 205 and the second side dump axis 206 simultaneously, the floor 107 will be locked in the lowered or neutral position, as illustrated in FIG. 2, relative to the frame 106. This would typically be the configuration when the side dumping haul body 101 is transporting a load from one location to another.

As illustrated in FIG. 1, the first sidewall 308 of the first sidewall structure 109 generally extends in the longitudinal direction of the side dumping haul body 101. However, an aft end section 310 of the first sidewall structure 109 extends in the lateral direction from the first sidewall 308 of the first sidewall structure 109. The laterally extending aft end section 310 of the first sidewall structure 109 is illustrated in FIG. 2. This aft end section 310 is shown extending from the outside surface 207 of the first sidewall structure 109 to the second side dump axis 206. In the present embodiment, the first sidewall structure 109 is also pivotally interconnected with the aft end wall 204 along a first sidewall pivot axis 201 that remains in a fixed position relative to the aft end wall 204— that is the first sidewall pivot axis 201 moves along with the aft end wall 204. The interconnection at the first sidewall pivot axis 201 may restrict the motion of the first sidewall structure 109 relative to the aft end wall 204 (and therefore relative to the floor 107 which is rigidly attached to the aft end wall 204) to pivoting or movement at least generally about the first sidewall pivot axis 201.

It should be appreciated that when the first sidewall structure 109 is pinned or locked to the floor 107 and the frame 106 along the second side dump axis 206 as described above, the first sidewall structure 109 will be locked relative to the floor 107. That is, since the sidewall 109 is in effect pinned or connected to the floor 107 at two different locations, i.e. the first sidewall pivot axis 201 (as the end wall 204 again is fixed relative to the floor 107) and the second side dump axis 206, the sidewall 109 will not be capable of moving relative to the floor 107 at this time. In a similar fashion, the second sidewall structure 203 is configured similarly to the first sidewall structure 109 and may be pivotally interconnected with the aft end wall 204 along a second sidewall pivot axis 202 that remains in a fixed position relative to the aft end wall 204. Therefore when the second sidewall structure 203 is in effect pinned or locked to the floor 107 and the frame 106 along the first side dump axis 205, the second sidewall structure 203 will be locked relative to the floor 107.

As stated above, the floor 107 may be locked in the lowered or neutral position by simultaneously pinning the floor 107 to the frame 106 along each of the first side dump axis 205 and along the second side dump axis 206. By also pinning the first sidewall structure 109 to the second side dump axis 206 and the second sidewall structure 203 to the first side dump axis 205 at this time, the entire haul body structure 101 (floor 107, aft end wall 204, fore end wall 303, first sidewall structure 109 and second sidewall structure 203) may be locked in place relative to the frame 106. This locked position of the side dumping haul body 101 may be used when transporting a load to a dumping site.

The side dumping haul body 101 as described may be unloaded from either side as will be discussed in more detail below. However, it should be appreciated that the side dumping haul body 101 could also be configured to only dump to one side if desired/required. For example, a side dumping haul body 101 capable of dumping to only the left side in the view presented in FIG. 2, may have the second sidewall structure 203 rigidly attached to the floor 107, aft end wall 204, and fore end wall 303, or otherwise such that the second sidewall structure 203 is always maintained in a fixed position relative to the floor 107. In such a configuration the second sidewall pivot axis 202 would not be present. The same would apply to the first sidewall structure 109 so as to be able to dump to the right side in the view presented in FIG. 2.

Figure 4A:
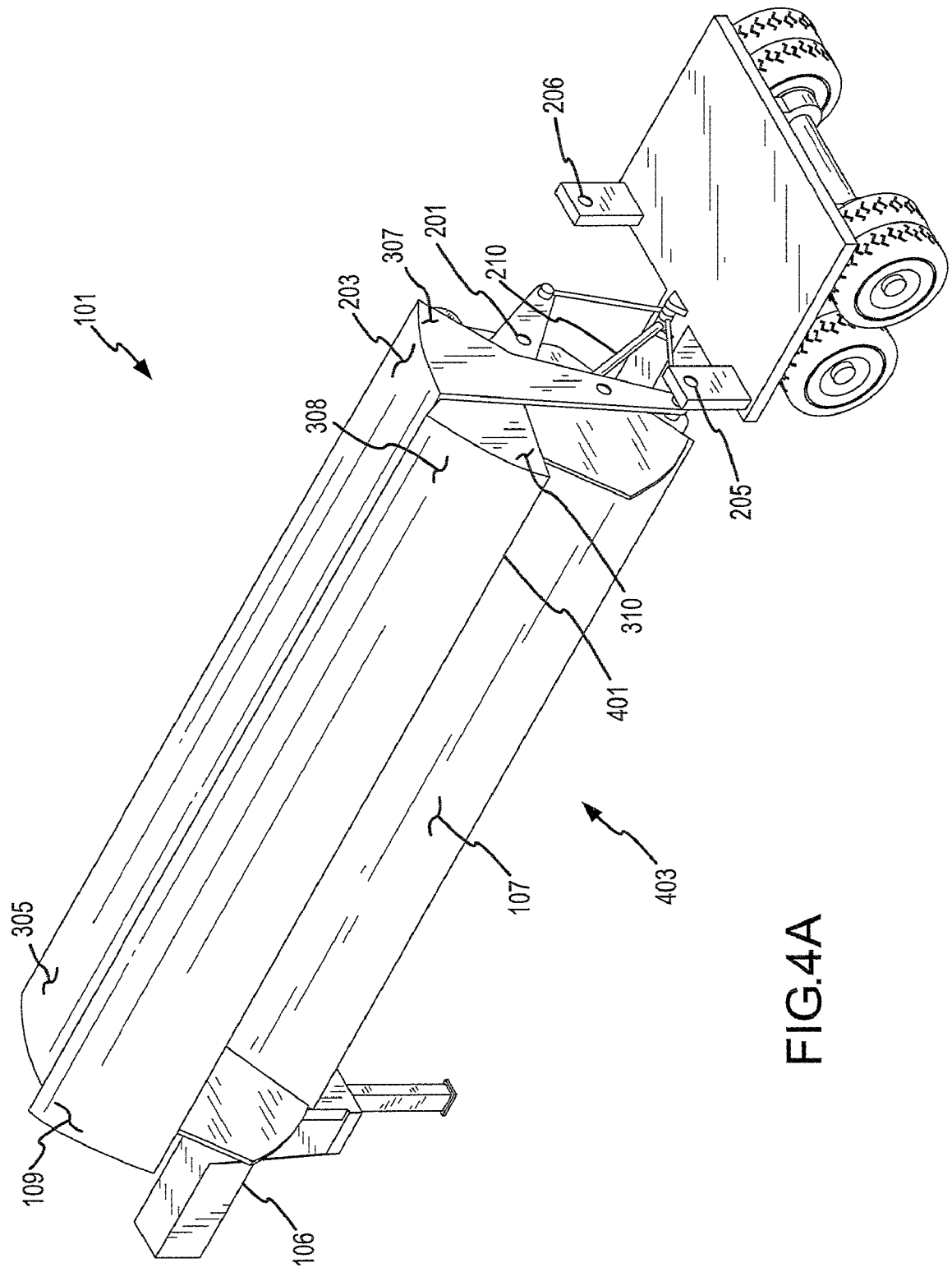
FIG. 4A is a perspective view of the side dumping haul body of FIG. 1 with the haul body in a fully pivoted position for dumping materials from the haul body to a first side.
Figure 4B:
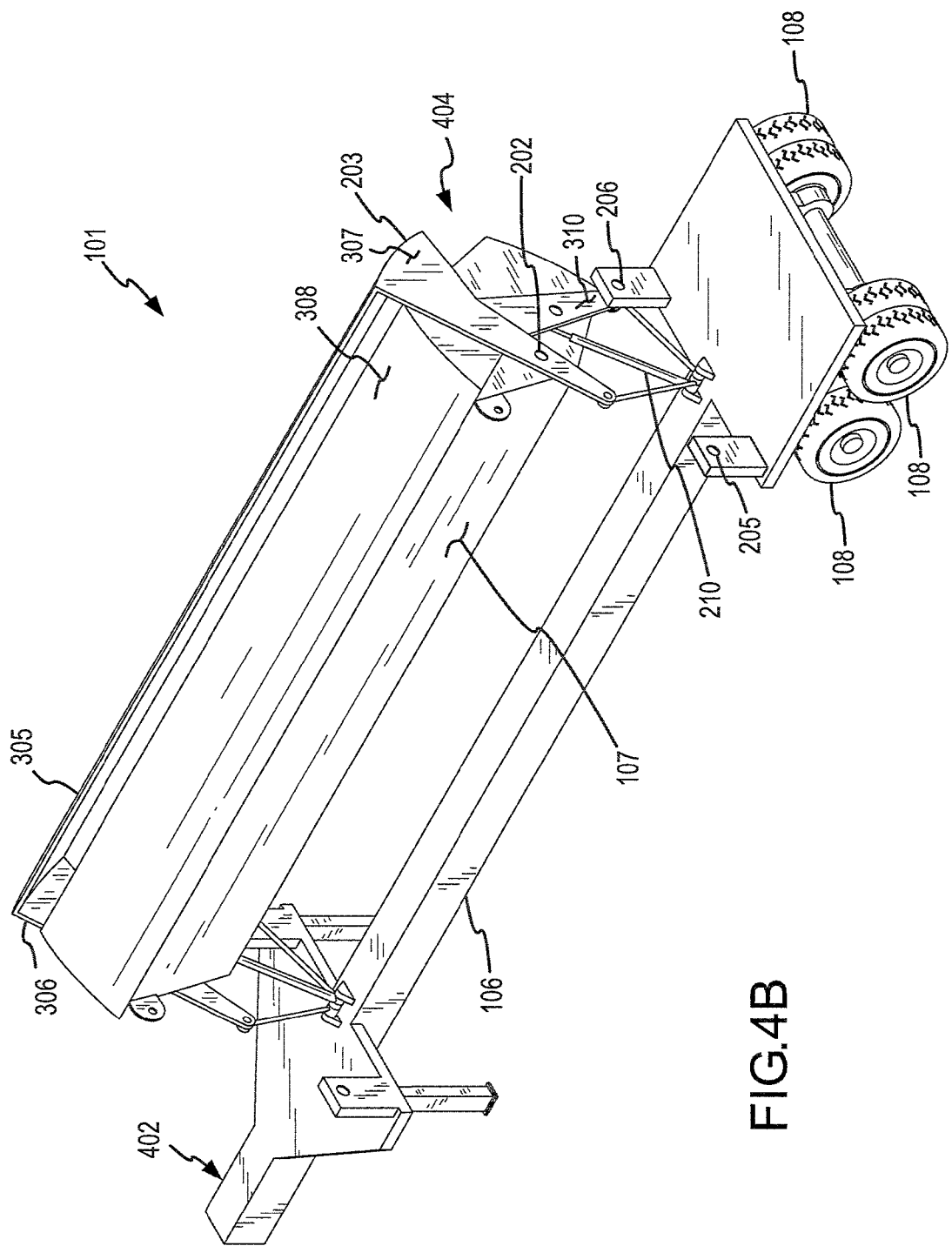
FIG. 4B is a perspective view of the side dumping haul body of FIG. 1 with the haul body in a fully pivoted position for dumping materials from the haul body to a second side.

FIGS. 4A and 4B depict the side dumping haul body 101 at two stages of a dumping sequence. FIG. 4A is a perspective view of the embodiment of FIGS. 1-3 from the same angle as shown in FIG. 3. In FIG. 4A, the first sidewall structure 109 and floor 107 have been unpinned or otherwise disconnected from the frame 106 along the second side dump axis 206. An actuator 210 has been extended, resulting in the floor 107 pivoting at least generally about the first side dump axis 205 so as to dump to a first side (e.g., via a tilting of the floor 107 in a first direction). The extension of actuator 210 has also caused the first sidewall structure 109 to pivot about the first sidewall pivot axis 201 and relative to the floor 107. The movement of the entire first sidewall 308 of the first sidewall structure 109 at least generally away from the floor 107 has created a first side discharge opening 403, which is the area between the floor 107 and a bottom lip 401 of the first sidewall structure 109. In this position, the load within the material holding area 302 of the side dumping haul body 101 will slide off the floor 107 and through the first side discharge opening 403. The load hauled by the side dumping haul body 101 may be road building materials, sand, gravel, agricultural products (e.g., sugar beets) or any other appropriate material. The actuator 210 may be positioned as shown in FIG. 4A. Another actuator 210 may be disposed on the fore end 104 of the side dumping haul body 101 to facilitate dumping if desired/required. Other configurations, such as having a single actuator be located centrally under the side dumping haul body 101 may also be utilized. Generally, any appropriate actuator or combination of actuators may be used to move the floor 107 for dumping operations (and thereby one of the first sidewall structure 109 and the second sidewall structure 203 as well).

Actuator 210 may be a hydraulic actuator, wherein pressurized hydraulic fluid introduced into the actuator 210 causes the actuator 210 to extend. Actuator 210 may be any other suitable type of actuator known to those skilled in the art. The actuator 210, as illustrated in FIG. 2, may be attached on one end to the frame 106 at an actuator pivot axis 213. The opposite end of the actuator 210 may be attached to the aft end wall 204 at an actuator to wall pivot 214. This actuator to wall pivot 214 is thereby maintained in a fixed position relative to the aft end wall 204—the position of the actuator to wall pivot 214 changes along with a change in the position of the aft end wall 204. Accordingly, extension of the actuator 210 causes the actuator to wall pivot 214 to move relative to and generally away from the actuator pivot axis 213.

The actuator 210 may contract due to the force of gravity acting on the floor 107 and first sidewall structure 109 once the hydraulic fluid pressure is relieved. Alternatively, the actuator 210 may be a bidirectional actuator in that pressurized hydraulic fluid introduced to a contraction port on the actuator 210 may cause the actuator 210 to contract or retract. After materials have been dumped from the side dumping haul body 101 or otherwise when desired, the floor 107 may be moved back to the lowered or neutral position as shown in FIG. 3 by removing the extension force of the actuator 210 and allowing gravity to pull the floor 107 down to the lowered or neutral position or by actively powering the actuator 210 to contract/retract and thereby pull the floor 107 down to the lowered or neutral position. The first sidewall structure 109 may then simultaneously pivot to the lowered or neutral position as shown in FIG. 3 when the floor 107 is pivoted into the lowered or neutral position. As noted earlier, by rigidly attaching the second sidewall structure 203 to the floor 107, an embodiment capable of only dumping to one side would be created.

FIG. 4B illustrates the side dumping haul body 101 of FIGS. 1 through 4A dumping to a second side (the right side of the side dumping haul body 101 in the view presented in FIG. 2). In FIG. 4B, the second sidewall structure 203 and floor 107 have been unpinned or otherwise disconnected from the frame 106 along the first side dump axis 205. The actuator 210 has been extended, resulting in the floor 107 now pivoting at least generally about the second side dump axis 206 so as to dump to a second side (e.g., via a tilting of the floor 107 in a second direction). The extension of actuator 210 has also caused the second sidewall structure 203 to pivot about the second sidewall pivot axis 202 and relative to the floor 107. The movement of the entire second sidewall 305 of the second sidewall structure 203 at least generally away from the floor 107 has created a second side discharge opening 404, which is the area between the floor 107 and a bottom lip of the second sidewall 305. In this position, the load within the material holding area 302 of the side dumping haul body 101 will slide off the floor 107 and through the second side discharge opening 404. After materials have been dumped from the side dumping haul body 101 or otherwise when desired, the floor 107 and second sidewall structure 203 may be moved to the lowered or neutral position in a manner similar to that described above.

It should be appreciated that although the embodiments described herein are of a side dumping haul body 101 mounted on to a trailer frame 106, this is for illustrative purposes only. Alternatively, the side dumping haul body 101 described herein may be mounted to a truck chassis or a chassis of any type, railcar, or any other transportable structure where it is desired that the load held within the haul body 101 be dumped to one side and/or the other. Additionally, although the frame 106 is illustrated as having a narrow center section underneath the side dumping haul body 101, the frame 106 may be of any appropriate size, shape, type and/or configuration. For example, the frame 106 may include of two or more frame rails generally located along the left and right sides of the trailer. Moreover, the wheels 108 of the trailer may be located as illustrated in FIG. 4B so that they are not underneath the side dumping haul body 101 or the wheels may be located partially or completely underneath the side dumping haul body 101. Similarly, the section 402 of the frame 106 that is interconnectable with a tractor may be located as illustrated in FIG. 4B so that it is not underneath the side dumping haul body 101 or the section 402 may be partially or completely underneath the side dumping haul body 101.

The floor 107 may be shaped in a variety of configurations. However, in a preferred embodiment and as shown in FIGS. 4A and 4B, the floor 107 may be V-shaped. The included angle of the V in the V-shaped floor 107 may influence several characteristics of the side dumping haul body 101. For example, the included angle of the V is directly related to the amount of tilting required to achieve a particular dump angle. A dump angle is the angle between the section of the floor 107 closest to the dump axis about which the floor 107 is being pivoted and the ground below the side dumping haul body 101. If the floor 107 were of a flat configuration (not shown), to achieve a 45° dump angle, the floor 107 would have to be tilted to 45°. Similarly, if the included angle of the V is 160°, each portion of the V will be at a 10° angle with respect to the ground below the side dumping haul body 101 when in the lowered or neutral position and would have to be tilted 55° to achieve a 45° dump angle.

An advantage of the V-shaped floor 107 is that the portion of the V of the floor 107 that is furthest from the dump axis about which the floor 107 is being pivoted will be at a substantially greater angle with respect to the ground below the side dumping haul body 101 than the other portion of the V of the floor 107. For example, if the included angle of the V is 160°, and the floor 107 is tilted 55°, the portion of the floor 107 that is furthest from the dump axis will be at an angle of 75° with respect to the ground below the side dumping haul body 101. As a result and when dumping, materials within the side dumping haul body 101 may begin to shift toward the discharge opening earlier in the dumping process than would occur with a flat floor.

Figure 5A:
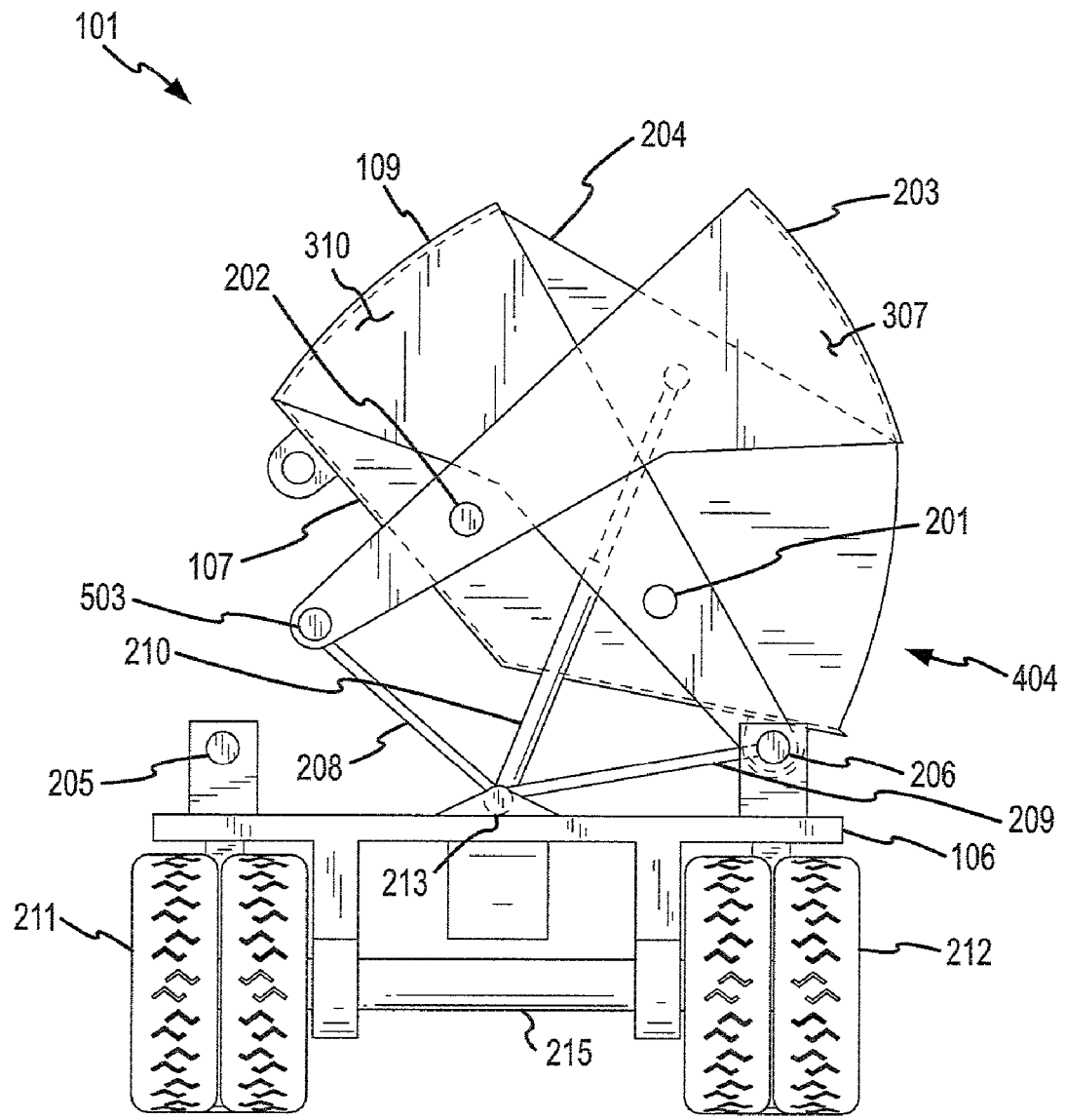
FIG. 5A is a rear end view of the side dumping haul body of FIG. 1 with the side dumping haul body in a partially pivoted position for dumping materials from the side dumping haul body to a second side.
Figure 5B:
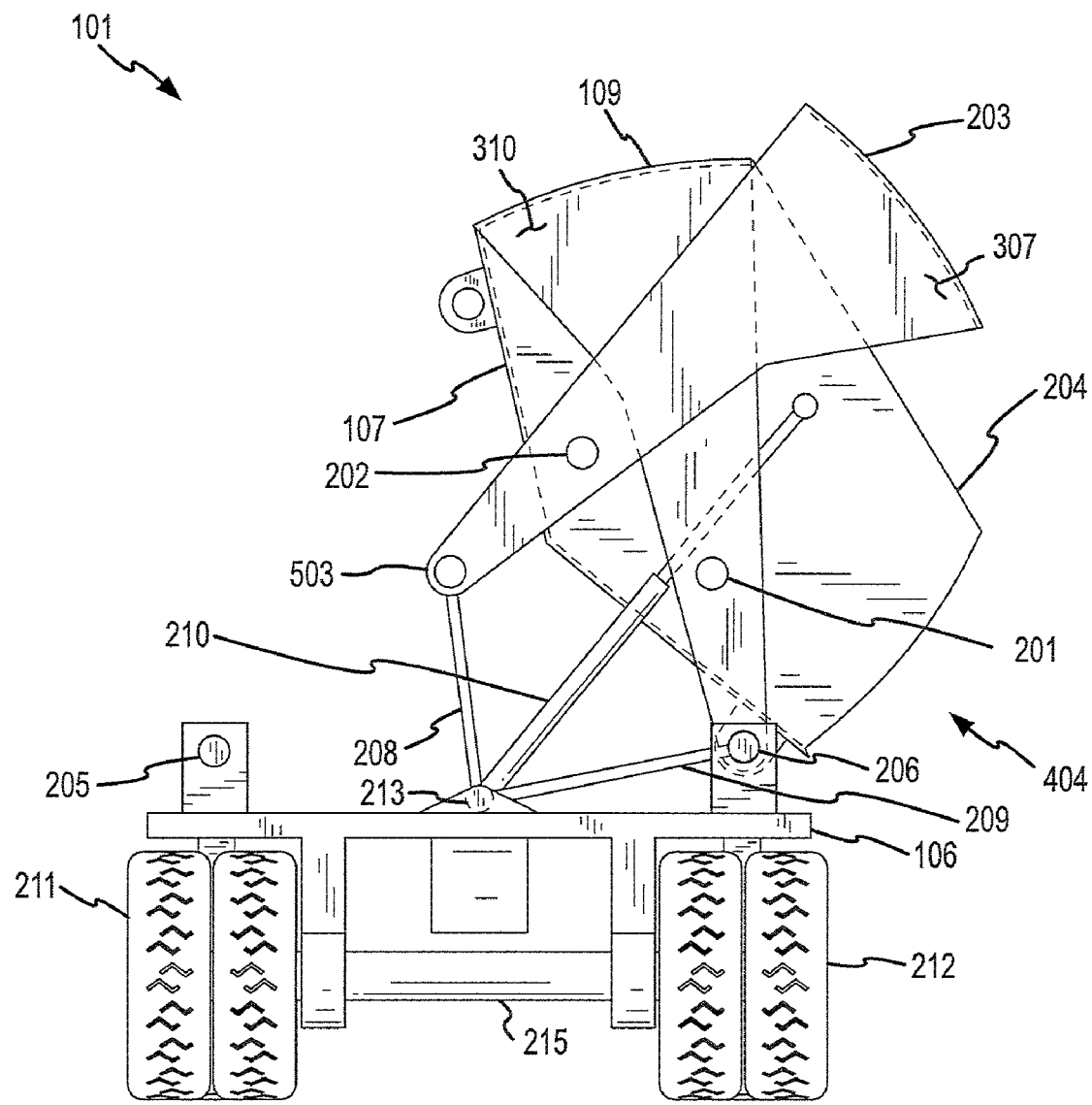
FIG. 5B is a rear end view of the side dumping haul body of FIG. 1 with the side dumping haul body in a fully pivoted position for dumping materials from the side dumping haul body to a second side.

The process of dumping materials out of the side dumping haul body 101 shown in FIG. 2 will now be summarized. FIG. 5B is an end view of the side dumping haul body 101 shown in FIG. 2 with the floor 107 having pivoted about the second side dump axis 206 to its end position. FIG. 5A is an end view of the side dumping haul body 101 with the floor 107 tilted to an intermediate point between those shown in FIGS. 2 and 5B.

As stated earlier, FIG. 2 shows a side dumping haul body 101 in a fully lowered or neutral position. Generally when transporting the side dumping haul body 101, the floor 107 will be pinned to the frame 106 both along the first side dump axis 205 and the second side dump axis 206. Also, the first sidewall structure 109 will be pinned to the frame 106 along the second side dump axis 206 and the second sidewall structure 203 will typically be pinned to the frame 106 along the first side dump axis 205. To dump materials out of the side dumping haul body 101 to the right side in the view presented in FIG. 2, the first step may be to unpin or otherwise disconnect the second sidewall structure 203 and the floor 107 from the frame 106 along the first side dump axis 205. Next, the actuator 210 is extended or activated. As shown in FIG. 5A, since the floor 107 is now only pinned or connected to the frame 106 along the second side dump axis 206, the extension of the actuator 210 causes the floor 107 to pivot at least generally about the second side dump axis 206. Since the aft end wall 204 and fore end wall 303 (not shown in FIG. 2, 5A, or 5B) are rigidly attached to the floor 107, they also are pivoted about the second side dump axis 206 by the extension of the actuator 210.

Since, in the current example, the first sidewall structure 109 has remained pinned or otherwise connected to the frame 106, its motion is limited to pivoting about the second side dump axis 206 as well. Because the first sidewall structure 109 is also pinned or otherwise connected to the floor 107 along the first sidewall pivot axis 201, the first sidewall structure 109 will pivot with the floor 107 as the floor 107 tilts due to the extension of the actuator 210. Therefore, throughout the illustrated dumping motion, the first sidewall structure 109, the aft end wall 204, the fore end wall 303 (not shown), and the floor 107 do not move relative to each other.

As stated earlier, the second sidewall structure 203 is unpinned or otherwise disconnected from the frame 106 to accommodate dumping to the right side of the side dumping haul body 101 in the view shown in FIG. 2. Since it is unpinned/disconnected, the second sidewall structure 203 may pivot relative to the floor 107 about the second sidewall pivot axis 202. However, this pivoted motion is limited/controlled by a second link 208 that is pivotally interconnected with both the frame 106 (about the actuator pivot axis 213) and the second sidewall structure 203 (about the second sidewall to second link pivot axis 503). The second link 208 is linked to the second sidewall structure 203 along a second sidewall to second link pivot axis 503. As illustrated in FIG. 2, the interconnection between the second link 208 and the frame 106 may be along a chassis to second link axis, which in the embodiment of FIG. 2 coincides with the actuator pivot axis 213. As will be shown in the discussion below related to additional embodiments, characteristics of the motion of the second sidewall structure 203 during the dumping process can be adjusted by varying one or more properties/characteristics of the second link 208, including the length and location of one or more associated attachment/pivot points. As shown in FIG. 5A, as the actuator 210 is extended or activated, the second link 208 controls the motion of the second sidewall structure 203 that was formerly pinned or otherwise connected to the first side dump axis 205. This causes the second sidewall structure 203 to pivot counterclockwise (in the view shown in FIG. 5A) with respect to the floor 107 about the second sidewall pivot axis 202 and as shown in FIG. 5A. This movement causes the bottom edge of the entire second sidewall 305 of the second sidewall structure 203 to move at least generally away from the floor 107 and creates a second side discharge opening 404 through which materials in the side dumping haul body 101 may be dumped.

Turning to FIG. 5B, as the actuator 210 continues to extend, the floor 107 continues to pivot about the second side dump axis 206. As shown in FIG. 5B, the first sidewall structure 109, the aft end wall 204, the fore end wall 303 (not shown), and the floor 107 continue not to move relative to each other. However, the second sidewall structure 203 continues to move counterclockwise relative to the floor 107 and at least generally about the second sidewall pivot axis 202 in the view presented in FIG. 5B, creating a larger second side discharge opening 404. Once all of the materials have been dumped from the side dumping haul body 101 or otherwise when desired, the actuator 210 may be deactivated, allowing the force of gravity to act upon the floor 107 and pivot it back into the lowered or neutral position as shown in FIG. 2. Once in the lowered or neutral position, the floor 107 and second sidewall structure 203 may be pinned or reconnected to the frame 106 along the first side dump axis 205 to secure the components in the lowered or neutral position. Alternatively and as previously noted, the actuator 210 may be configured to actively contract/retract and pull the floor 107 back to the lowered or neutral position.

Similar to the above-described motion, the side dumping haul body 101 may be dumped to the opposite side from that shown in FIGS. 5A and 5B. To achieve this, the floor 107 and second sidewall structure 203 would be unpinned or otherwise disconnected from the frame 106 along the first side dump axis 205, while the floor 107 and the first sidewall structure 109 would be unpinned or otherwise disconnected from the frame 106 along the second side dump axis 206. Under these circumstances, the extension of actuator 210 would cause the floor 107 to pivot about the first side dump axis 205. At the same time, a first link 209 would cause the first sidewall structure 109 to move clockwise about the first sidewall pivot axis 201 in the view presented in FIG. 2, and with its first sidewall 308 moving at least generally away from the floor 107 to create a first side discharge opening 403. The first link 209 is pivotally interconnected with the first sidewall structure 109 about a first sidewall to first link pivot axis 405 that coincides with the second side dump axis 206 in the lowered or neutral position of FIG. 2, and with the frame 106 about a chassis to first link axis, which in the embodiment of FIG. 2 coincides with the actuator pivot axis 213.

The center of gravity of the side dumping haul body 101 will shift during the dumping process. Generally, prior to any tilting of the floor 107, the lateral center of gravity of the side dumping haul body 101 will be oriented over a lateral midpoint of an axle 215 of the trailer 102. Returning to FIGS. 2, 5A, and 5B, as the floor 107 is pivoted about the second side dump axis 206, the center of gravity of the side dumping haul body 101 will shift toward the second side dump axis 206. However, unlike known systems as discussed above, the center of gravity of the side dumping haul body 101 generally will not shift more than a distance equivalent to about one quarter of the length of the axle 215. In other words, the lateral center of gravity is no more than about one quarter of the length of the axle 215 from the lateral midpoint when the floor 107 is in the fully tilted position. This relatively small shift in the location of the center of gravity while the side dumping haul body 101 is in a fully raised position, as shown in FIG. 5B, reduces the risk of the side dumping haul body 101 tipping over when compared to many known side dumping systems. The minimal shift in the center of gravity also allows better control of the flow of materials out of the side dumping haul body 101 during a dumping operation as compared to many known systems. For example, known systems where the shift of the center of gravity of the haul body and trailer are excessive may begin to tip while dumping material. This may result in an unplanned acceleration of the rate of the dumping of the material. Whereas in the case of the side dumping haul body 101, since the tipping due to the dumping of the load is less likely to occur, the dumping of the load can be performed in a more controlled and predictable manner resulting in safety and efficiency benefits.

Various known material dumping systems utilize end walls or sidewalls that are hinged along a top or bottom edge. The systems typically rely on gravity to open up a discharge opening when the haul body is tilted. These systems have several drawbacks not present in the case of the side dumping haul body 101 and the variations thereof to be addressed herein. A hinged sidewall dump body must be latched or somehow held in place during transport of materials. Before dumping, the latch must be released. However, material within the haul body may be pressing against the side and the unlatching may cause the materials within to spill out uncontrollably. Furthermore, when the dumping operation is finished the hinged sidewall may not fully close due to the interference of undumped material or because the haul body is not on level ground. In the embodiment illustrated in FIGS. 2, 5A and 5B, the relative motion between the sidewall structures 109, 203 and floor 107 is directly linked, and therefore when the floor 107 is returned to the lowered or neutral position, the sidewall structures 109, 203 are actively pulled into a lowered or neutral position to thereby sufficiently seal the side dumping haul body 101. Any material between a sidewall structure 109, 203 and the floor 107 may be crushed or ejected as the sidewall structure 109, 203 is actively pulled down to the floor 107. Also, as opposed to an uncontrolled hinged sidewall, the discharge openings 403, 404 created during the dumping process are a function of floor angle and are generally independent of any pressure on the sidewall structures 109, 203 caused by the materials within the side dumping haul body 101, thus allowing the discharge opening 403, 404 size to be desirably controlled. Other benefits include that the sidewall structures 109, 203 will not swing open at unwanted times, such as an unlatched hinged sidewall might as a vehicle goes around the corner or traverses a laterally oriented grade.

As shown in FIG. 2, the first sidewall structure 109 may be curved with a center of curvature at least generally about the first sidewall pivot axis 201. This configuration allows the first sidewall structure 109 to seal against the fore and aft end walls 204, 303 when the floor 107 is in the lowered or neutral position. This configuration also allows the second sidewall structure 203 to remain in close proximity to or in contact with the right side of the aft end wall 204 and the right side of the fore end wall 303 (not shown) during the initial phases of the illustrated dumping cycle.

As shown in FIG. 2, the interconnection between the first link 209 and the frame 106 and the interconnection between the second link 208 and the frame 106 are disposed at a common first elevation. The interconnection between the first link 209 and the aft end section 310 of the first sidewall structure 109 and the interconnection between the second link 208 and the aft end section 307 of the second sidewall structure 203 are disposed at a common second elevation. In the embodiment illustrated in FIG. 2, both the first elevation and the second elevation are different from each other, and both elevations are closer to a lower extreme of the side dumping haul body 101 than an upper extreme of the side dumping haul body 101.

The above-described first link 209 and second link 208 are of a fixed length. Alternatively, the first link 209 and second link 208 may be hydraulically (or otherwise) powered links, unpowered telescoping links, chains, cables or any other appropriate form of mechanical linkage. For example, if the second link 208 shown in FIG. 5A was a hydraulically powered link, it could be extended relative to the length shown in FIG. 5A so that the second sidewall structure 203 remains in contact with the floor 107, thereby dumping no material. Such independent control of the motions of the sidewall structures 109 and 203 may enable the dumping of the material from the side dumping haul body 101 to be performed in a precisely controlled manner. For example, a sidewall structure 109, 203 could be moved a few inches relative to the floor 107, resulting in a small amount of material flowing from the side dumping haul body 101. This control would be beneficial if only a small amount of material was desired to be dumped in a particular location or if it was desired to lay down a strip of material in which case the entire tractor-trailer combination could be moving while dumping material through a relatively small discharge opening.

An unpowered flexible or variable link may be substituted for the first link 209 and second link 208 as well. For example, if the second link 208 shown in FIG. 5A was a chain longer in length than second link 208, there would be no motion of the second sidewall structure 203 relative to the floor 107 as the floor 107 is initially moved from the lowered or neutral position. Since the majority of the mass of the second sidewall structure 203 is located to the right of the second sidewall pivot axis 202 as shown in FIG. 2, in the absence of second link 208, the second sidewall structure 203 may tend to stay in contact with the floor 107 as the floor 107 is pivoted about the second side dump axis 206. By selecting a particular length of chain to be substituted for second link 208, a motion profile where the second sidewall structure 203 does not pivot relative to the floor 107 until the floor 107 has pivoted a predetermined amount about the second side dump axis 206 can be achieved. In such an embodiment, the side dumping haul body 101 may operate as follows. In the lowered or neutral position, the second link 208 in the form of a chain could have a predetermined amount of slack. As actuator 210 is extended or activated and the floor 107 pivots about the second side dump axis 206, second sidewall structure 203 does not pivot relative to the floor 107 and no dumping of materials occurs. During the extension of actuator 210 and the pivoting of the floor 107 about the second side dump axis 206, the second link 208 in the form of a chain may eventually become taut. As the floor 107 is pivoted beyond this point, the second link 208 now in the form of a taut chain and the pivoting of the floor 107 result in the second sidewall structure 203 pivoting relative to the floor 107 and opening up a second side discharge opening 404 in the above-noted manner. Similar results for dumping material to the other side may be achieved by replacing the first link 209 with a chain of predetermined length.

Frequently, a tarp but may be employed to cover the material holding section of a haul body during transport. In traditional one-piece side dumping haul body systems, the tarp must be removed or repositioned to allow the material to flow from the haul body when it is dumping. In the current embodiment, and indeed in all of the disclosed embodiments herein, a tarp may be affixed over the material holding section 302 of the side dumping haul body 101. For example and with reference to FIG. 5A, a tarp may be affixed to the top longitudinal edges of the first sidewall structure 109 and the second sidewall structure 203. The tarp may be sized to be relatively taut when the sidewall structures 109, 203 are in the lowered or neutral position. When dumping, the top longitudinal edges of the sidewall structures 109, 203 will move relatively closer to each other, causing the tarp to become slack. For example and as shown in FIG. 5A, the second sidewall structure 203 is pivoted so that its top longitudinal edge has moved closer to the top longitudinal edge of the first sidewall structure 109. A tarp attached between the two longitudinal edges in this position would simply become slack and drape downward into the material holding section 302 of the side dumping haul body 101. The material being hauled within the side dumping haul body 101 would be able to flow out of the relevant side discharge opening 403, 404 without interference from the tarp. When the side dumping haul body 101 is lowered back into its lowered or neutral position, the tarp would once again become relatively taut. The tarp may be configured to be removable for ease of loading material into the side dumping haul body 101.

Although the figures and discussions above generally relate to a side dumping haul body 101 capable of dumping out of either a left or right side, it should be appreciated that the disclosed features can also be applied to a side dumping haul body capable of only dumping to one side. It should also be appreciated that although the above description describes a system where the sidewall structures 109, 203 are operable to be pinned or otherwise connected to the dump axes 205, 206, this is not a necessity for the operation of the disclosed embodiment. For example, to achieve the motion of the first sidewall structure 109, which does not pivot relative to the floor 107, it is not necessary that the first sidewall structure 109 be pinned or otherwise connected to the frame 106 along the second side dump axis 206. In other words, as long as the floor 107 is pinned or otherwise connected to the frame 106 along the second side dump axis 206, the first sidewall structure 109 will not pivot relative to the floor 107.

Figure 6A:
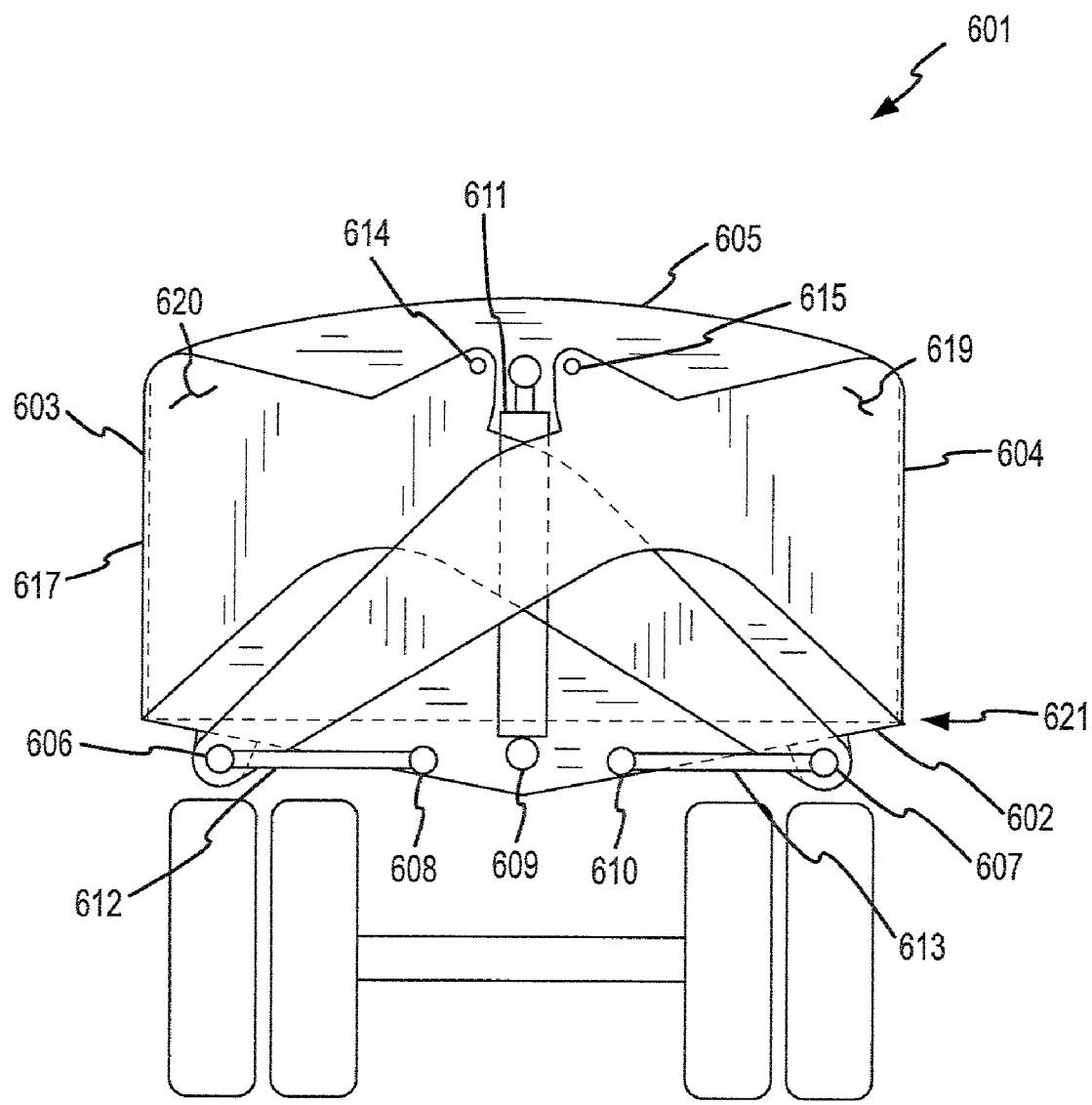
FIG. 6A is a rear end view of one alternative embodiment of a side dumping haul body.
Figure 6B:
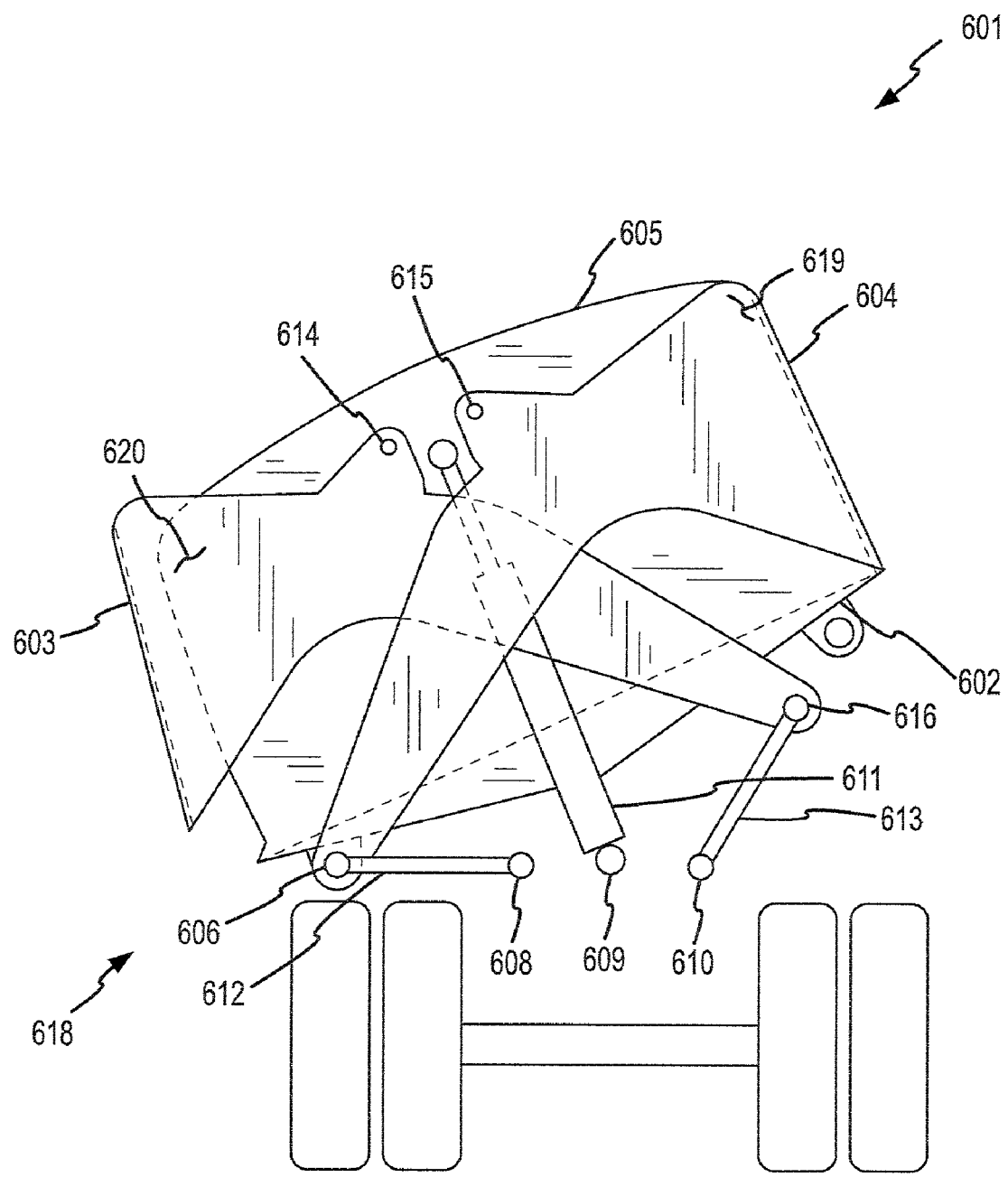
FIG. 6B is a rear end view of the alternative embodiment of the side dumping haul body of FIG. 6A in a partially pivoted position for dumping materials from the side dumping haul body to a first side.
Figure 6C:
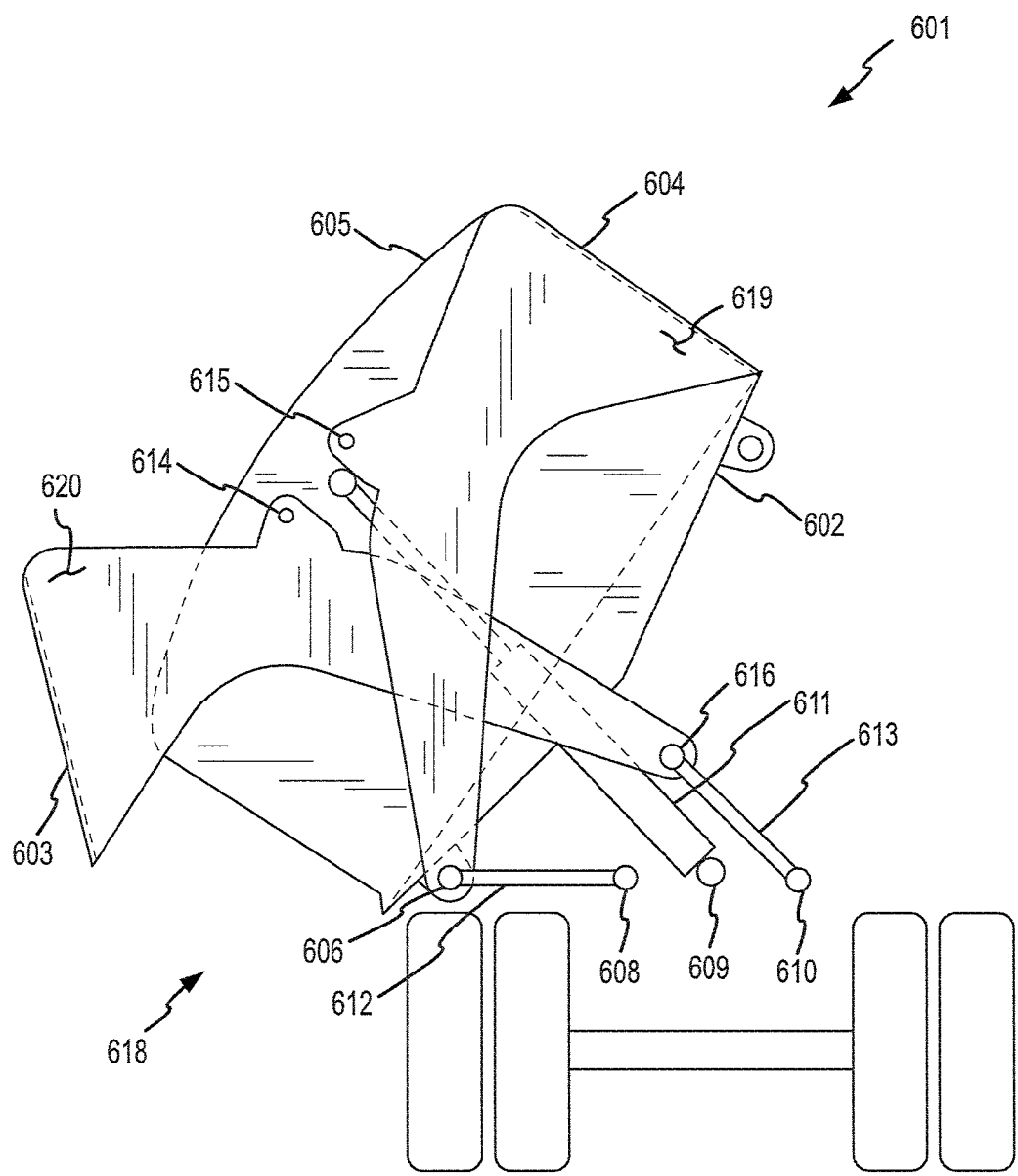
FIG. 6C is a rear end view of the alternative embodiment of the side dumping haul body of FIG. 6A in a fully pivoted position for dumping materials from the side dumping haul body to a first side.

FIGS. 6A through 6C depict an additional embodiment at two stages of a dumping sequence. For clarity and ease of description, some components depicted in FIG. 2 are not shown in FIG. 6A. FIG. 6A is an end view of a side dumping haul body 601 with a floor 602 in a lowered or neutral position. In such a lowered or neutral position, the haul body material holding area may be formed by the floor 602, the first sidewall 603, the second sidewall 604, the aft end wall 605 and a fore end wall (not visible in FIGS. 6A through 6C).

Several mechanical features such as linkages, actuators and pivot points combine to control the motion and position of various components of the side dumping haul body 601. In the current embodiment, these components have been configured differently relative to those of FIG. 2 in order to achieve specific characteristics.

The side dumping haul body 601 of FIGS. 6A through 6C may be selectably pivoted at least generally about either a first side dump axis 606 or a second side dump axis 607. Both the first side dump axis 606 and the second side dump axis 607 are oriented or extend in the longitudinal dimension of the side dumping haul body 601. Several features located along the first side dump axis 606 and the second side dump axis 607 will now be described. The side dumping haul body 601 could also be adapted to only dump to a single side in the same general manner discussed above with regard to the side dumping haul body 101.

For clarity, in FIGS. 6A through 6C the frame of the side dumping haul body 601 is not depicted. A portion of the frame may be aligned with the first side dump axis 606. When in the lowered or neutral position, a portion of the floor 602 may also be aligned with the first side dump axis 606. Also, a portion of a second sidewall structure aft end section 619, which is rigidly attached to the second sidewall 604 may be aligned with the first side dump axis 606. Therefore and as shown in FIGS. 6A through 6C, the frame, the floor 602 and the second sidewall structure aft end section 619 may all have portions aligned along the first side dump axis 606. A mechanical device, such as a pin inserted into holes in the frame, the floor 602, and the second sidewall structure aft end section 619, may link the floor 602 and the second sidewall 604 together so that the only substantial relative motion between the frame and the floor 602/second sidewall 604 would be a collective pivoting motion of the floor 602/second sidewall 604 at least generally about the first side dump axis 606. Any other suitable method of selectively restricting motion of individual components relative to each other to allow for a collective pivoting motion or the like about an axis, known to those skilled in the art, may be used. The pin or other locking device may be selectably engageable. Moreover, any manner of fixing one or more of the floor 602 and the second sidewall 604 relative to each other, such that they may collectively move at least generally about the first side dump axis 606, may be utilized.

In a similar fashion, the frame, the floor 602, and a first sidewall structure aft end section 620 may all have portions aligned along the second side dump axis 607. A similar mechanical device to that discussed above may be used to link these components with respect to each other so that the only substantial relative motion between the frame and the floor 602/first sidewall 603 would be a collective pivoting motion of the floor 602/first sidewall 603 at least generally about the second side dump axis 607. As along the first side dump axis 606, the pin or other locking device along the second side dump axis 607 may be selectably engageable. Moreover, any manner of fixing one or more of the floor 602 and the first sidewall 603 relative to each other, such that they may collectively move at least generally about the second side dump axis 607, may be utilized. It should be appreciated that if the floor 602 is pinned or locked to the frame along the first side dump axis 606 and the second side dump axis 607 simultaneously, the floor 602 will be locked in the lowered or neutral position, as illustrated in FIG. 6A, relative to the frame.

As illustrated in FIG. 6A, and similar to the side dumping haul body 101 depicted in FIG. 2, the first sidewall 603 generally is oriented in the longitudinal direction of the side dumping haul body 601. The first sidewall structure aft end section 620 is rigidly connected to the first sidewall 603 and extends generally perpendicular in the lateral direction from the first sidewall 603 (the first sidewall structure aft end section 620 and the first sidewall 603 may collectively be characterized as a first sidewall structure in accordance with the foregoing). The laterally extending first sidewall structure aft end section 620 that is rigidly connected to the first sidewall 603 is illustrated in FIG. 6A. This section is shown extending from the outside surface 617 of the first sidewall 603 to the second side dump axis 607. In the present embodiment, the first sidewall 603 is pivotally interconnected with the aft end wall 605 along a first sidewall pivot axis 614 that remains in a fixed position relative to the aft end wall 605. The interconnection at the first sidewall pivot axis 614 may restrict the motion of the first sidewall 603 relative to the aft end wall 605 (and therefore to the floor 602 which is rigidly attached to the aft end wall 605) to pivoting about the first sidewall pivot axis 614. The location of the first sidewall pivot axis 614 is a factor in determining the characteristics of the motion of the first sidewall 603 as the floor 602 is tilted. This will be discussed in detail below.

It should be appreciated that when the first sidewall 603 is pinned or locked to the floor 602 and the frame along the second side dump axis 607 as described above, the first sidewall 603 will be locked relative to the floor 602. That is, since the first sidewall 603 is pinned or otherwise connected relative to the floor 602 at two different locations, i.e. the first sidewall pivot axis 614 (as the end wall 605 is fixed relative to the floor 602) and the second side dump axis 607 (as the first sidewall structure aft end section 620 is rigidly connected to the first sidewall 603), the first sidewall 603 will not be capable of moving relative to the floor 602. The second sidewall 604 may be configured similar to the first sidewall 603 and may be pivotally interconnected with the aft end wall 605 along a second sidewall pivot axis 615 that remains in a fixed position relative to the aft end wall 605. Therefore, when the second sidewall 604 is pinned or locked to the floor 602 and the frame along the first side dump axis 606, the second sidewall 604 will also be locked relative to the floor 602. These features are similar to those described with respect to the embodiment depicted in FIG. 2.

The floor 602 may be locked in the lowered or neutral position by simultaneously pinning or otherwise connecting the floor 602 to the frame along the first side dump axis 606 and the second side dump axis 607. By also pinning or otherwise connecting the first sidewall 603 to the second side dump axis 607 and the second sidewall 604 to the first side dump axis 606, the entire side dumping haul body 601 (floor 602, aft end wall 605, a fore end wall (not shown in FIGS. 6A-6C), first sidewall 603 and second sidewall 604) may be locked in place relative to the frame. This locked position may be used when transporting a load to a dumping site.

FIG. 6B is an end view of a side dumping haul body 601 with the floor 602 tilted to an intermediate point between those shown in FIG. 6A and FIG. 6C. FIG. 6C is an end view of the side dumping haul body 601 shown in FIG. 6A with the floor 602 pivoted about the first side dump axis 606.

Generally, such as when transporting the side dumping haul body 601, the floor 602 may be pinned or otherwise connected to the frame along the first side dump axis 606 and the second side dump axis 607. Also, the first sidewall 603 may be pinned or otherwise connected to the frame along the second side dump axis 607 and the second sidewall 604 may be pinned or otherwise connected to the frame along the first side dump axis 606. To dump materials out of the side dumping haul body 601 to the left side in the view presented in FIG. 6A, the first step may be to unpin the first sidewall structure aft end section 620 and the floor 602 from the frame along the second side dump axis 607. Next, an actuator 611 is extended. As shown in FIG. 6B, since the floor 602 is only pinned or otherwise connected to the frame along the first side dump axis 606, the extension of the actuator 611 causes the floor 602 to pivot about the first side dump axis 606. Since the aft end wall 605 and fore end wall (not shown in FIGS. 6A through 6C) are rigidly attached to the floor 602, they also are pivoted about the first side dump axis 606 by the extension of the actuator 611.

Since, in the current example, the second sidewall structure aft end section 619 has not been unpinned or otherwise disconnected from the frame, its motion is limited to pivoting about the first side dump axis 606. Because the second sidewall structure aft end section 619 is also pinned or otherwise connected to the floor 602 along the second sidewall pivot axis 615, the second sidewall 604 will pivot with the floor 602 as the floor tilts due to the extension of the actuator 611. Therefore, throughout the illustrated dumping motion, the second sidewall 604, the aft end wall 605, the fore end wall (not shown), and the floor 602 do not move relative to each other.

As stated earlier, the first sidewall structure aft end section 620 is unpinned or otherwise disconnected from the frame to accommodate dumping to the left side of the side dumping haul body 601 in the view shown in FIG. 6A. Since it is unpinned or otherwise disconnected, the first sidewall 603 may pivot relative to the floor 602 about the first sidewall pivot axis 614. However, this movement is limited by a first link 613 interconnected with the frame and the first sidewall structure aft end section 620. It should be noted that in the current embodiment, the actuator 611 is pivotally linked to the frame at an actuator mount 609, the first link 613 is pivotally linked to the frame at a first link mount 610, and a second link 612 is pivotally linked to the frame at a second link mount 608. Moreover, the actuator mount 609, the first link mount 610, and the second link mount 608 are spaced from each other. Furthermore, the first link 613 is pivotally linked to the first sidewall structure aft end section 620 and the second link 612 is pivotally linked to the second sidewall structure aft end section 619.

As shown in FIG. 6B, as the actuator 611 is extended, the first link 613 limits the motion of the first sidewall 603. This causes the first sidewall 603 to pivot clockwise (in the view shown in FIG. 6B) with respect to the floor 602 as shown in FIG. 6B. This pivoting causes the bottom edge of the first sidewall 603 to move at least generally away from the floor 602 and creates a first side discharge opening 618 through which materials in the side dumping haul body 601 may be dumped.

Turning to FIG. 6C, as the actuator 611 continues to extend, the floor 602 continues to pivot about the first side dump axis 606. As shown in FIG. 6C, the second sidewall 604, the aft end wall 605, the fore end wall (not shown), and the floor 602 continue not to move relative to each other. However, the first sidewall 603 continues to pivot clockwise relative to the floor 602 and about the first sidewall pivot axis 614 in the view presented in FIG. 6C, creating a larger first side discharge opening 618. Once all of the materials have been dumped from the side dumping haul body 601 or otherwise when desired, the actuator 611 may be deactivated allowing the force of gravity to act upon the floor 605 and pivot it back into the lowered or neutral position as shown in FIG. 6A. Once in the lowered or neutral position, the floor 602 and the first sidewall structure aft end section 620 may be pinned or reconnected to the frame along the second side dump axis 607 to secure the components in the lowered or neutral position. Alternatively and as previously noted, the actuator 611 may be configured to actively contract/retract and pull the floor 602 back to the lowered or neutral position. Similar to the above described motion, the side dumping haul body 601 may be dumped to the opposite side from that shown in FIGS. 6A through 6C.

As discussed above with respect to FIGS. 2, 5A and 5B, the center of gravity of the side dumping haul body 601 will shift during the dumping process. However, the shifting of the center of gravity will be similar to that as discussed above with respect to FIGS. 2, 5A and 5B, therefore also having the advantages as described in relation to that previously discussed embodiment. Also, similar to as discussed with reference to FIG. 2, the first link 612 and the second link 613 of the embodiment of FIG. 6A may be hydraulically (or otherwise) powered links, unpowered telescoping links, chains, cables or other form of mechanical linkage. The advantages of such a configuration would be similar to those discussed with reference to FIG. 2.

In comparing the embodiment depicted in FIGS. 2, 5A and 5B to the embodiment depicted in FIGS. 6A through 6C, it can be seen that the repositioning of certain components may result in different performance characteristics. For example, the first and second sidewall pivot axes 614, 615 in the embodiment of FIG. 6A are positioned relatively higher with respect to the floor 602 than the first and second sidewall pivot axes 201, 202 of the embodiment of FIG. 2. This positioning results in differing opening motions of the sidewalls of the respective embodiments. As can be seen in FIG. 6B, the high placement of the first sidewall pivot axis 614 results in a significant component of the initial movement of the first sidewall 603 being lateral to the side dumping haul body 601. Such movement allows the material handling area of the side dumping haul body 601 to be generally rectangular in cross section as can be seen in FIG. 6A. For comparison, the sidewalls 109, 203 of the embodiment in FIG. 2 may be curved with a corresponding curve in the aft end wall 204 to accommodate the relatively low position of the sidewall pivot axes 201, 202.

By positioning of the pivot points 610, 608 of the first and second links 613, 612 and selecting appropriate lengths for the first and second links 613, 612, the size of the discharge openings created during the dumping motion can be determined. The rate at which the discharge opening opens relative to the position of the floor 602 can also be controlled. For example, in comparing FIG. 6B to the FIG. 5A, it can be seen that for approximately the same amount of pivoting of the floor, a much smaller discharge opening 618 is present in the embodiment of FIG. 6B then in the embodiment of FIG. 5A. The relatively small opening 618 of the embodiment of FIG. 6B may have the advantage that the flow of material out of the side dumping haul body 601 may be at a reduced rate. This could be advantageous if it is desired to only allow a small amount of material to flow from the side dumping haul body 601 or if it is desired to only have a minimal flow of materials from the side dumping haul body 601 while the side dumping haul body 601 is moved longitudinally, resulting in the material being distributed over an extended distance. As shown in FIG. 6A, the floor 602 may be flat. Alternatively, the floor 602 may be V-shaped similar to the floor 107 illustrated in FIG. 2. Also similar to the embodiment of FIG. 2, the sidewall aft end sections 619, 620 need not be pinned to their respective dump axes 606, 607 to achieve the motion illustrated in FIGS. 6A through 6C.

As shown in FIG. 6A, the second link mount 608, the interconnection between the second link 612 and the second sidewall structure aft end section 619 rigidly attached to the second sidewall 604, the first link mount 610, and the interconnection between the first link 613 and the first sidewall structure aft end section 620 rigidly attached to the first sidewall 603 are disposed at a common first elevation when the side dumping haul body 601 is in a lowered or neutral position. In the embodiment illustrated in FIG. 6A, the first elevation is closer to a lower extreme of the side dumping haul body 601 than an upper extreme of the side dumping haul body 601. Also as shown in FIG. 6A, the first sidewall pivot axis 614 and the second sidewall pivot axis 615 are disposed at a common second elevation when the side dumping haul body 601 is in a lowered or neutral position. In the embodiment illustrated in FIG. 6A, the second elevation is closer to an upper extreme of the side dumping haul body 601 than a lower extreme of the side dumping haul body 601.

Figure 7A:
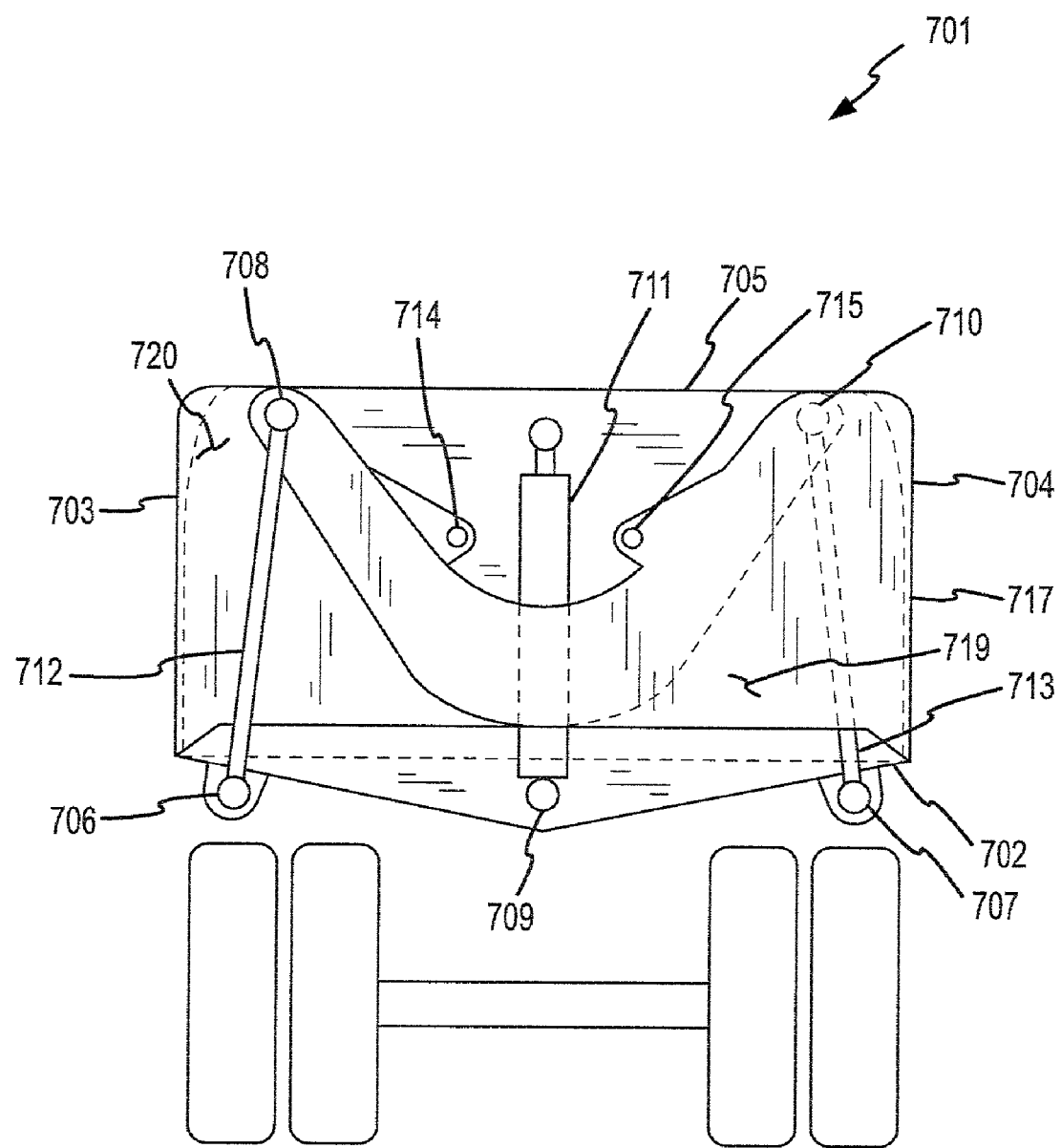
FIG. 7A is a rear end view of another alternative embodiment of a side dumping haul body.
Figure 7B:
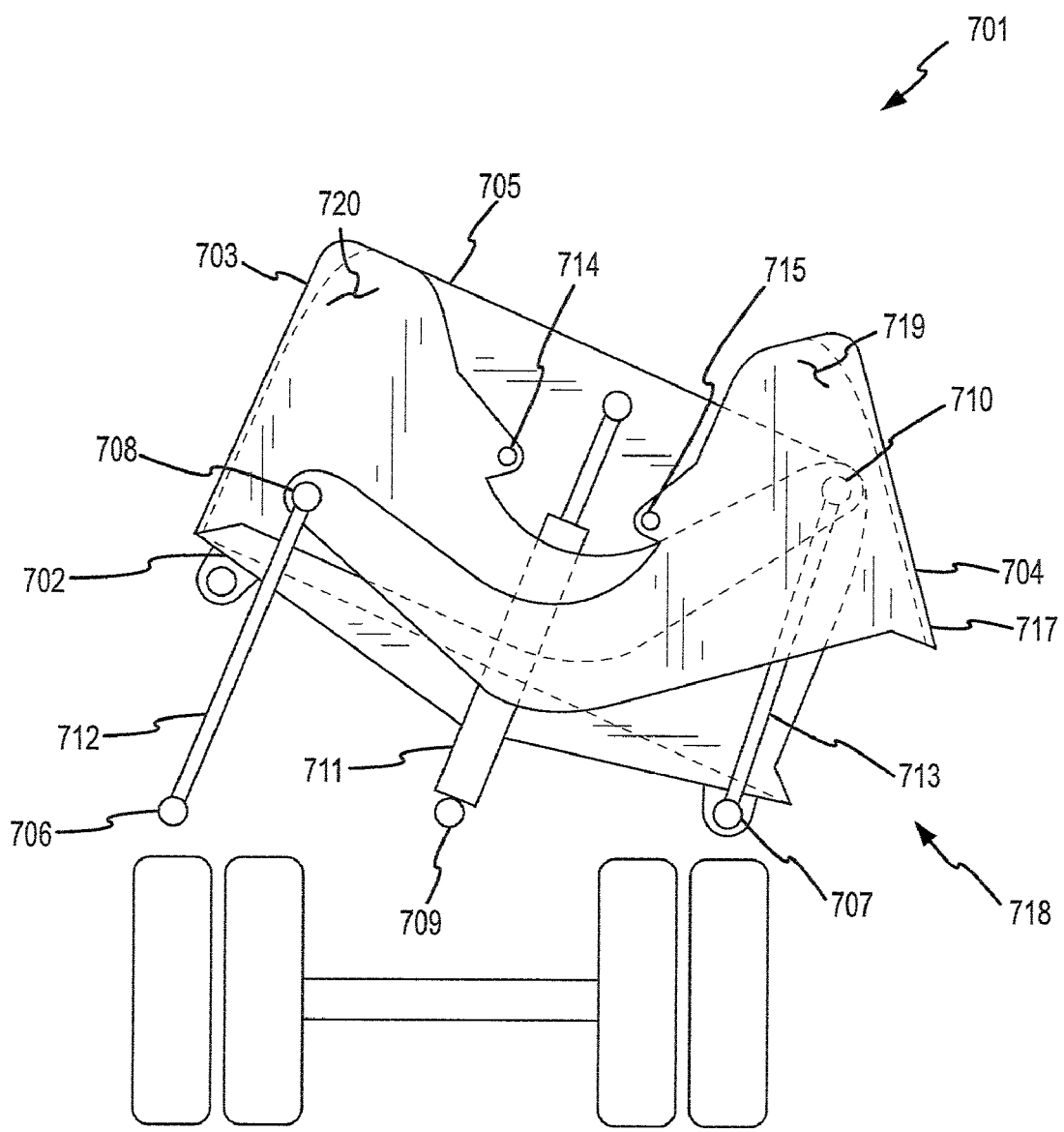
FIG. 7B is a rear end view of the alternative embodiment of the side dumping haul body of FIG. 7A in a partially pivoted position for dumping materials from the side dumping haul body to a second side.
Figure 7C:
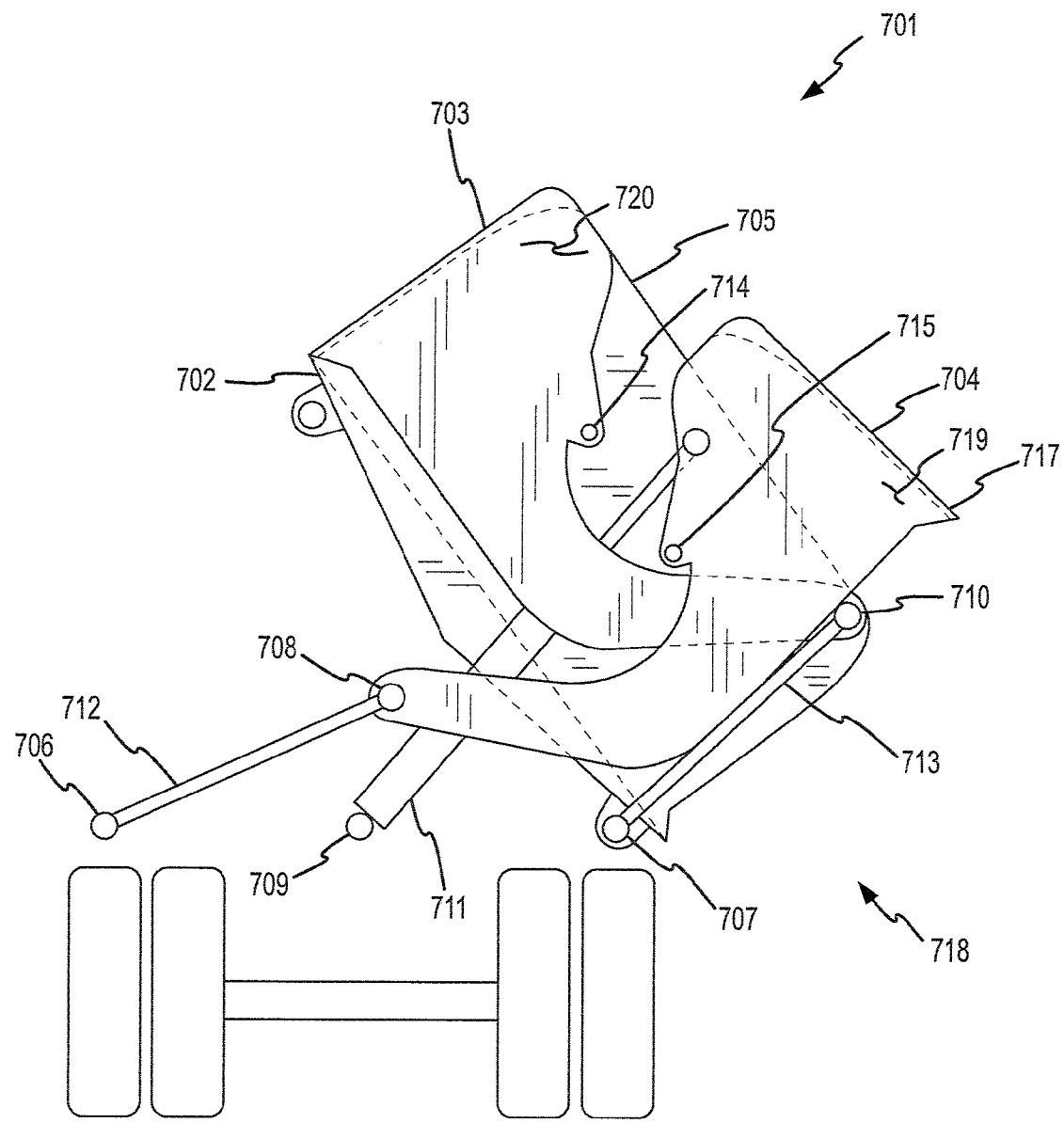
FIG. 7C is a rear end view of the alternative embodiment of the side dumping haul body of FIG. 7A in a fully pivoted position for dumping materials from the side dumping haul body to a second side.

FIGS. 7A through 7C depict yet another embodiment at two stages of a dumping sequence. For clarity and ease of description, some components depicted in FIG. 2 are not shown in FIG. 7A. FIG. 7A is an end view of a side dumping haul body 701 with a floor 702 in a lowered or neutral position. In such a lowered or neutral position, the haul body material holding area may be formed by the floor 702, the first sidewall 703, the second sidewall 704, the aft end wall 705 and a fore end wall (not visible in FIGS. 7A through 7C).

As in the discussion of the previous embodiment, several mechanical features such as linkages, actuators and pivot points combine to control the motion and position of various components of the side dumping haul body 701. In the current embodiment, these components have been configured differently relative to those of FIGS. 2 and 6A in order to achieve specific characteristics.

The side dumping haul body 701 of FIGS. 7A through 7C may be selectably pivoted at least generally about either a first side dump axis 706 or a second side dump axis 707. Both the first side dump axis 706 and the second side dump axis 707 are oriented or extend in the longitudinal dimension of the side dumping haul body 701. Several features located along the first side dump axis 706 and the second side dump axis 707 will now be described. The side dumping haul body 701 could also be adapted to only dump to a single side in the same general manner discussed above with regard to the side dumping haul body 101.

For clarity, in FIGS. 7A through 7C the frame of the side dumping haul body 701 is not depicted. A portion of the frame may be aligned with the first side dump axis 706. When in the lowered or neutral position, a portion of the floor 702 may also be aligned with the first side dump axis 706. A mechanical device, such as a pin inserted into holes in the frame and the floor 702, may link the floor 702 to the frame so that the only substantial relative motion between the frame and the floor 702 would be a pivoting motion of the floor 702 at least generally about the second side dump axis 707. Any other suitable method of selectively restricting motion of individual components relative to each other to allow for a pivoting motion or the like about an axis, known to those skilled in the art, may be used. The pin or other locking device may be selectably engageable. Moreover, any manner of fixing the floor 702, such that it may move at least generally about the second side dump axis 707, may be utilized.

In a similar fashion, the frame and the floor 702 may have portions aligned along the second side dump axis 707. A similar mechanical device to that discussed above may be used to link these components with respect to each other so that the only substantial relative motion between the frame and floor 702 would be a pivoting motion of the floor 702 at least generally about the second side dump axis 707. As along the first side dump axis 706, the pin or other locking device along the second side dump axis 707 may be selectably engageable. Moreover, any manner of fixing the floor 702, such that it may move at least generally about the second side dump axis 607, may be utilized. It should be appreciated that if the floor 702 is pinned or locked to the frame along the first side dump axis 706 and the second side dump axis 707 simultaneously, the floor 702 will be locked in the lowered or neutral position, as illustrated in FIG. 7A, relative to the frame.

As illustrated in FIG. 7A, and similar to the side dumping haul body 101 depicted in FIG. 2, the second sidewall 704 generally is oriented in the longitudinal direction of the side dumping haul body 701. The second sidewall structure aft end section 719 may be rigidly connected to the second sidewall 704 and extend generally perpendicular in the lateral direction from second sidewall 704 (the second sidewall structure aft end section 719 and the second sidewall 704 may collectively be characterized as a second sidewall structure in accordance with the foregoing). The laterally extending second sidewall structure aft end section 719 that is rigidly connected to the second sidewall 704 is illustrated in FIG. 7A. This section is shown extending from the outside surface of the second sidewall 717 to the second sidewall to second link pivot axis 708. In the present embodiment, the second sidewall 704 is pivotally interconnected with the aft end wall 705 along a second sidewall pivot axis 715 that remains in a fixed position relative to the aft end wall 705. The interconnection at the second sidewall pivot axis 715 may restrict the motion of the second sidewall 704 relative to the aft end wall 705 (and therefore to the floor 702 which is rigidly attached to the aft end wall 705) to pivoting about the second sidewall pivot axis 715.

It should be appreciated that when the floor 702 is pinned or locked to the frame along the first side dump axis 706, the second sidewall 704 will not be capable of pivoting relative to the floor due to the configuration of the second link 712 interconnected between the frame along the first side dump axis 706 and the second sidewall structure aft end section 719 at the second sidewall to second link pivot axis 708. In a similar fashion, the first sidewall 703 is configured similar to the second sidewall 704 and may be pivotally interconnected with the aft end wall 705 along a first sidewall pivot axis 714 that remains in a fixed position relative to the aft end wall 605. Therefore when the floor 702 is pinned or locked to the frame along the second side dump axis 707, the first sidewall 703 will be locked relative to the floor 702.

The floor 702 may be locked in the lowered or neutral position by simultaneously pinning or otherwise connecting the floor 702 to the frame along the first side dump axis 706 and the second side dump axis 707. In this manner, the entire side dumping haul body 701 (floor 702, aft end wall 705, a fore end wall (not shown in FIGS. 7A-7C), first sidewall 703 and second sidewall 704) may be locked in place relative to the frame. This locked position may be used when transporting a load to a dumping site.

FIG. 7B is an end view of a side dumping haul body 701 with the floor 702 tilted to an intermediate point between those shown in FIG. 7A and FIG. 7C. FIG. 7C is an end view of the side dumping haul body 701 shown in FIG. 7A with the floor 702 pivoted about the second side dump axis 707.

Generally, such as when transporting the side dumping haul body 701, the floor 702 may be pinned or otherwise connected to the frame along the first side dump axis 706 and the second side dump axis 707. To dump materials out of the side dumping haul body 701 to the right side in the view presented in FIG. 7C, the first step may be to unpin or otherwise disconnected the floor 702 from the frame along the first side dump axis 706. Next, an actuator 711 is extended. As shown in FIG. 7B, since the floor 702 is only pinned or otherwise connected to the frame along the second side dump axis 707, the extension of the actuator 711 causes the floor 702 to pivot about the second side dump axis 707. Since the aft end wall 705 and fore end wall (not shown in FIGS. 7A through 7C) are rigidly attached to the floor 702, they also are pivoted about the second side dump axis 707 by the extension of the actuator 711.

Since, in the current example, the floor 702 has not been unpinned or otherwise disconnected from the frame along the second side dump axis 707, the motion of the first sidewall 703 is limited to pivoting about the second side dump axis 707. Because the first sidewall aft end structure 720 is also pinned or otherwise connected to the floor 702 along the first sidewall pivot axis 714, the first sidewall 703 will pivot with the floor 702 as the floor 702 tilts due to the extension of the actuator 711. Therefore, throughout the illustrated dumping motion, the first sidewall 703, the aft end wall 705, the fore end wall (not shown), and the floor 702 do not move relative to each other.

The second sidewall 704 may pivot relative to the floor 702 about the second sidewall pivot axis 715 when the floor 702 is pivoted about the second side dump axis 707. However, this movement is limited by a second link 712 interconnected with the frame along the first side dump axis 706 on one end and the second sidewall aft end structure 719 on the other end. It should be noted that in the current embodiment, the actuator 711 is pivotally linked to the frame at an actuator mount 709, the first link 713 is pivotally linked to the frame at a first link mount along the second side dump axis 707, and a second link 612 is pivotally linked to the frame at a second link mount along the first side dump axis 706. Furthermore, the first link 713 is pivotally linked to the first sidewall aft end section 720 and the second link 712 is pivotally linked to the second sidewall aft end section 719.

As shown in FIG. 7B, as the actuator 711 is extended, the second link 712 limits the motion of the second sidewall 704. This causes the second sidewall 704 to pivot counterclockwise (in the view shown in FIG. 7B) with respect to the floor 702 as shown in FIG. 7B. This pivoting causes the bottom edge of the second sidewall 704 to move away from the floor 702 and creates a second side discharge opening 718 through which materials in the side dumping haul body 701 may be dumped.

Turning to FIG. 7C, as the actuator 711 continues to extend, the floor 702 continues to pivot about the second side dump axis 707. As shown in FIG. 7C, the first sidewall 703, the aft end wall 705, the fore end wall (not shown), and the floor 702 continue not to move relative to each other. However, the second sidewall 704 continues to pivot counterclockwise relative to the floor 702 and about the second sidewall pivot axis 715 in the view presented in FIG. 7C, creating a larger second side discharge opening 718. Once all of the materials have been dumped from the side dumping haul body 701, the actuator 711 may be deactivated allowing the force of gravity to act upon the floor 705 and pivot it back into the lowered or neutral position as shown in FIG. 7A. Once in the lowered or neutral position, the floor 702 may be pinned or reconnected to the frame along the first side dump axis 706 to secure the components in the lowered or neutral position. Alternatively and as previously noted, the actuator 711 may be configured to actively contract/retract and pull the floor 702 back to the lowered or neutral position. Similar to the above described motion, the side dumping haul body 701 may be dumped to the opposite side from that shown in FIGS. 7A through 7C.

As shown in FIG. 7A, the interconnection between the first link 713 and the frame (along the second side dump axis 607) and the interconnection between the second link 712 and the frame (along the first side dump axis 706) are disposed at a common first elevation. The interconnection between the first link 713 and the first sidewall structure aft end section 720 rigidly attached to the first sidewall 703 and the interconnection between the second link 712 and the second sidewall structure aft end section 719 rigidly attached to the second sidewall 704 are disposed at a common second elevation when the side dumping haul body 701 is in a lowered or neutral position. In the embodiment illustrated in FIG. 7A, the first elevation is closer to a lower extreme of the side dumping haul body 701 than an upper extreme of the side dumping haul body 701 and the second elevation is closer to the upper extreme of the side dumping haul body 701 than the lower extreme of the side dumping haul body 701. Also as shown in FIG. 7A, the first sidewall pivot axis 714 and the second sidewall pivot axis 715 are disposed at a common third elevation when the side dumping haul body 701 is in a lowered or neutral position. In the embodiment illustrated in FIG. 7A, the third elevation is lower than the second elevation.

As discussed above with respect to FIGS. 2, 5A and 5B, the center of gravity of the side dumping haul body 701 will shift during the dumping process. However, the shifting of the center of gravity will be similar to that as discussed above with respect to FIGS. 2, 5A and 5B, therefore also having the advantages as described in relation to that previously discussed embodiment. Also, similar to as discussed with reference to FIG. 2, the first link 713 and the second link 712 of the embodiment of FIG. 7A may be hydraulically (or otherwise) powered links, unpowered telescoping links, chains, cables or other form of mechanical linkage. The advantages of such a configuration would be similar to those discussed with reference to FIG. 2.

In comparing the embodiments depicted in FIGS. 2 and 6A to the embodiment depicted in FIGS. 7A through 7C, it can be seen that the repositioning of certain components may result in different performance characteristics. For example, the embodiment of FIG. 7A achieves a larger discharge opening 718 when the floor 702 is tilted a predetermined amount as shown in FIG. 7B when compared to the discharge opening 618 of the embodiment shown in FIG. 6B. It should be appreciated that by varying certain aspects of the embodiments such as pivoting locations, link lengths, sidewall profiles, and floor shape, different characteristics can be achieved.

Although the figures and discussions above generally relate to a side dumping haul body 701 capable of dumping out of either a left or right side, it should be appreciated that the disclosed features can also be applied to a side dumping haul body capable of only dumping to one side.

Figure 8:
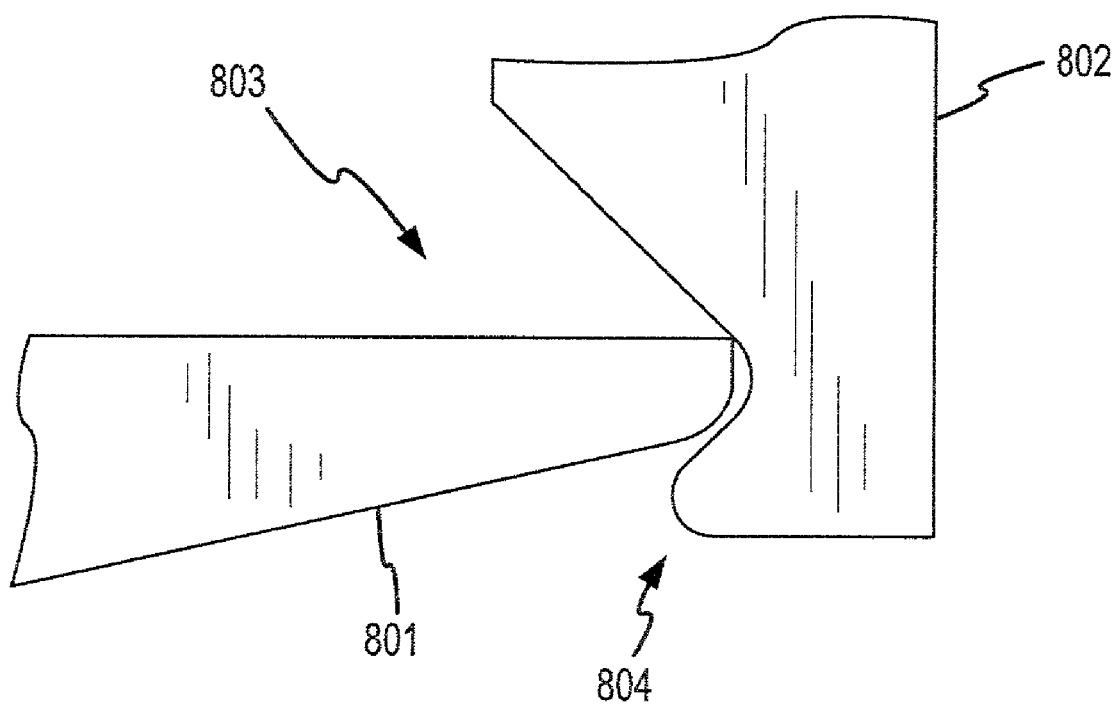
FIG. 8 is a partial view of an exemplary interface between a floor and a sidewall of a side dumping haul body.

Various methods may be utilized to seal the various sidewalls discussed above to the floor sections when the components are in the lowered or neutral positions. Once such exemplary sidewall-to-floor interface is illustrated in FIG. 8, which is a detailed illustration of the interface between a floor 801 a sidewall 802. Only a portion of each of these components is depicted in FIG. 8. The area shown in FIG. 8 may, for example, correspond to the lower right hand corner 621 (shown in FIG. 6A) of the side dumping haul body 601.

Previously, it was noted that the motion of the sidewalls 603, 604 of the embodiment depicted in FIGS. 6A through 6C has a lateral component with respect to the floor 602. This aspect allows the sidewall 802 to be designed as shown in FIG. 8. Specifically, since the sidewall 802 may move laterally away from the floor 801, the bottom of the sidewall 802 may include a lip or protrusion 804. When in the lowered or neutral position the edge of the floor 801 may fit into a channel in between the main part of the sidewall 802 and the protrusion 804. Such a configuration may create a positive seal or mechanical interlock which may help to keep material that is within the hauling area of the side dumping haul body 803 from spilling out of the side dumping haul body. The protrusion 804 may also help to support the floor 801 when the floor 801 is supporting the weight of the material within the hauling area of the side dumping haul body 803. Other sealing methods between the sidewall 802 and the floor 801 known to those skilled in the art may also be incorporated.

Figure 9:
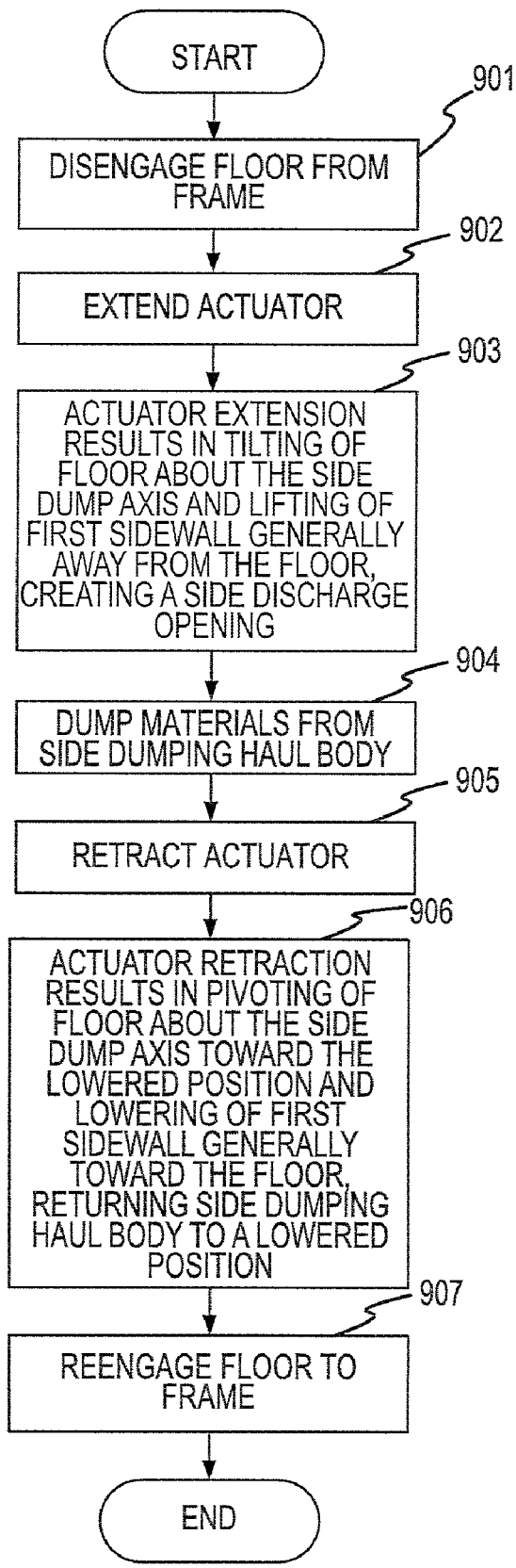
FIG. 9 is a flowchart directed to one embodiment of a method of dumping material from a side dumping haul body.

FIG. 9 illustrates a methodology of dumping materials from a side dumping haul body. The illustration is in the form of a flowchart wherein the first step is to disengage 901 a floor-to-frame connection between a floor and a frame of a side dumping haul body. This operation could be in a form of manually removing a pin or other locking device or removing a pin or other locking device through mechanically assisted means such as a hydraulic actuator. The disengagement may include disengaging connections at both a fore end and an aft end of the side dumping haul body.

Following disengagement, the next step is to extend 902 an actuator. The actuator may be hydraulic, electric, mechanical or of any other suitable configuration known to those skilled in the art. If for example, the actuator is hydraulic, an operator may activate it by releasing high-pressure hydraulic fluid into the actuator, causing the actuator to extend 902.

At this point in the methodology, the floor will be pinned to the frame along a side dump axis and the extension of the actuator will result in the floor pivoting about the side dump axis resulting in the floor being tilted 903. Generally simultaneously with the tilting of the floor, a first sidewall will generally lift away from the floor creating a side discharge opening. As the floor is tilted, materials within the side dumping haul body will begin to dump 904.

After the desired amount of material has been dumped out of the side dumping haul body, the actuator may be retracted 905. The retraction 905 of the actuator may be powered or unpowered. Powered retraction may be in the forms of hydraulically, electrically or mechanically powered retraction. Unpowered retraction may be accomplished by removing the force that caused the actuator to expand and allowing gravity to pull the floor and sidewall back into the lowered or neutral position. The retraction of the actuator may result in the floor of the side dumping haul body pivoting 906 about the side dump axis toward the lowered or neutral position. Generally simultaneously with the tilting of the floor toward the lowered or neutral position, the sidewall will generally move toward the floor. Once the floor and sidewall are in the lowered or neutral position, the next step is to reengage 907 the floor and the frame. Once reengaged, the side dumping haul body will be restricted from moving relative to the frame and be ready for transport.

The foregoing description of the present invention has been presented for purposes of illustration and description. Furthermore, the description is not intended to limit the present invention to the form disclosed herein. Consequently, variations and modifications commensurate with the above teachings, and skill and knowledge of the relevant art, are within the scope of the present invention. The embodiments described hereinabove are further intended to explain best modes known of practicing the present invention and to enable others skilled in the art to utilize the present invention in such, or other embodiments and with various modifications required by the particular application(s) or use(s) of the present invention. It is intended that the appended claims be construed to include alternative embodiments to the extent permitted by the prior art.

What is claimed:

1. A side dumping haul body, comprising:
   a floor supported by a frame, wherein said floor comprises fore and aft end walls that are spaced in a longitudinal dimension, wherein a lateral dimension is orthogonal to said longitudinal dimension, and wherein said floor is tiltable in said lateral dimension;
   a first sidewall movable relative to said floor;
   a second sidewall movable relative to said floor, wherein said second sidewall is spaced from said first sidewall in said lateral dimension; and
   a first actuator extending between said frame and one of said fore and aft end walls, wherein activation of said first actuator with said side dumping haul body in a first configuration lifts an entirety of said first sidewall at least generally away from said floor to define a first discharge opening, wherein activation of said first actuator with said side dumping haul body in a second configuration lifts an entirety of said second sidewall at least generally away from said floor to define a second discharge opening, and wherein only one of said first and second discharge openings can exist at one time.

2. A side dumping haul body, as claimed in claim 1, further comprising:
   a first sidewall pivot axis, wherein said first sidewall is detachably interconnectable with said floor, and wherein said first sidewall is pivotable relative to said floor about said first sidewall pivot axis when said first sidewall is disconnected from said floor;
   a first side dump axis, wherein said floor is pivotable about said first side dump axis; and
   a first link that is pivotable about a chassis-to-first link axis, wherein said first link is pivotally interconnected with said first sidewall through a first sidewall-to-first link pivot axis, wherein said first sidewall pivot axis, said first side dump axis and said chassis-to-first link axis are spaced from each other.

3. A side dumping haul body, as claimed in claim 2, further comprising:
   a second sidewall pivot axis, wherein said second sidewall is detachably interconnectable with said floor, and wherein said second sidewall is pivotable relative to said floor about said second sidewall pivot axis when said second sidewall is disconnected from said floor;
   a second side dump axis, wherein said floor is pivotable about said second side dump axis; and
   a second link that is pivotable about a chassis-to-second link axis, wherein said second link is pivotally interconnected with said second sidewall through a second sidewall-to-second link pivot axis, wherein said second sidewall pivot axis, said second side dump axis and said chassis-to-second link axis are spaced from each other.

4. A side dumping haul body, as claimed in claim 3, wherein said chassis-to-first link axis and said chassis-to-second link axis are coaxial.

5. A side dumping haul body, as claimed in claim 4, wherein said first actuator is pivotable about an actuator pivot axis, wherein said actuator pivot axis is coaxial with said chassis-to-first link axis and said chassis-to-second link axis.

6. A side dumping haul body, as claimed in claim 3, wherein said chassis-to-first link axis and said chassis-to-second link axis are spaced in said lateral dimension.

7. A side dumping haul body, as claimed in claim 6, wherein said first actuator is pivotable about an actuator pivot axis, wherein said actuator pivot axis, said chassis-to-first link axis and said chassis-to-second link axis are spaced from each other in said lateral dimension.

8. A side dumping haul body, as claimed in claim 3, wherein said first sidewall-to-first link pivot axis, said chassis-to-first link axis, said second sidewall-to-second link pivot axis, and said chassis-to-second link axis are disposed at a common elevation prior to any tilting of said floor.

9. A side dumping haul body, as claimed in claim 3, wherein said chassis-to-first link axis and said chassis-to-second link axis are disposed at a common first elevation prior to tilting of said floor, wherein said first sidewall-to-first link pivot axis and said second sidewall-to-second link pivot axis are disposed at a common second elevation prior to tilting of said floor, and wherein said first and second elevations are different.

10. A side dumping haul body, as claimed in claim 9, wherein said first and second elevations are each closer to a lower extreme of said side dumping haul body than an upper extreme of said side dumping haul body.

11. A side dumping haul body, as claimed in claim 9, wherein said first elevation is closer to a lower extreme of said side dumping haul body than an upper extreme of said side dumping haul body, and wherein said second elevation is closer to said upper extreme of said side dumping haul body than said lower extreme of said side dumping haul body.

12. A side dumping haul body, as claimed in claim 2, wherein said first sidewall-to-first link pivot axis and said chassis-to-first link axis are disposed at a common elevation prior to tilting of said floor.

13. A side dumping haul body, as claimed in claim 2, wherein said chassis-to-first link axis is disposed at a first elevation prior to tilting of said floor, wherein said first sidewall-to-first link pivot axis is disposed at a second elevation prior to said tilting of said floor, and wherein said first and second elevations are different.

14. A side dumping haul body, as claimed in claim 13, wherein said first and second elevations are each closer to a lower extreme of said side dumping haul body than an upper extreme of said side dumping haul body.

15. A side dumping haul body, as claimed in claim 13, wherein said first elevation is closer to a lower extreme of said side dumping haul body than an upper extreme of said side dumping haul body, and wherein said second elevation is closer to said upper extreme of said side dumping haul body than said lower extreme of said side dumping haul body.

16. A side dumping haul body, as claimed in claim 2, wherein said first sidewall is curved in a constant radius about at least generally said first sidewall pivot axis.

17. A side dumping haul body, as claimed in claim 2, wherein said first actuator is pivotable about an actuator pivot axis, wherein said actuator pivot axis is coaxial with said chassis-to-first link axis.

18. A side dumping haul body, as claimed in claim 2, further comprising:
   an axle extending in said lateral direction; and
   a side dumping haul body lateral center of gravity oriented over a lateral midpoint of said axle prior to tilting of said floor, wherein said lateral center of gravity is no more than about ¼ of a length of said axle from said lateral midpoint when said floor is in a first fully tilted position where said first sidewall has moved at least generally away from said floor to define said first discharge opening.

19. A side dumping haul body, as claimed in claim 1, further comprising:
   a second actuator extending between said frame and the other of said fore and aft end walls, wherein activation of said second actuator with said side dumping haul body in said first configuration assists said first actuator in lifting an entirety of said first sidewall at least generally away from said floor to define said first discharge opening, and wherein activation of said second actuator with said side dumping haul body in said second configuration assists said first actuator in lifting an entirety of said second sidewall at least generally away from said floor to define said second discharge opening.

20. A side dumping haul body, as claimed in claim 1, wherein:
   said floor comprises a first floor edge; and
   said first sidewall comprises a first sidewall channel, wherein said first floor edge is positioned within said first sidewall channel when said floor is in a lowered position.

21. A side dumping haul body, as claimed in claim 1, wherein activation of said first actuator with said side dumping haul body in said first configuration both tilts said floor in one direction and moves said first sidewall at least generally away from said floor to define said first discharge opening, and wherein activation of said first actuator with said side dumping haul body in said second configuration both tilts said floor in an opposite direction and moves said second sidewall at least generally away from said floor to define said second discharge opening.

22. A side dumping haul body, as claimed in claim 1, wherein said floor is v-shaped.

* * * * *

UNITED STATES PATENT AND TRADEMARK OFFICE
CERTIFICATE OF CORRECTION

PATENT NO.        : 8,136,886 B2                                    Page 1 of 1
APPLICATION NO.   : 12/756556
DATED             : March 20, 2012
INVENTOR(S)       : Ronald L. Hehn It is certified that error appears in the above-identified patent and that said Letters Patent is hereby corrected as shown below:

Title Page:
Item (60) delete "60/746,729 filed on May 26, 2005" and insert therefor -- 60/684,867 filed on May 26, 2005 --.

Signed and Sealed this
Twenty-ninth Day of April, 2014

Michelle K. Lee
*Deputy Director of the United States Patent and Trademark Office*